United States Patent
Mori et al.

(10) Patent No.: US 10,137,907 B2
(45) Date of Patent: Nov. 27, 2018

(54) STARTUP SUGGESTION DEVICE AND STARTUP SUGGESTION METHOD

(71) Applicant: DENSO CORPORATION, Kariya, Aichi-pref. (JP)

(72) Inventors: Takuya Mori, Kariya (JP); Hiroaki Tanaka, Kariya (JP); Ifushi Shimonomoto, Kariya (JP); Mitsuo Tamagaki, Kariya (JP); Yuki Fujisawa, Kariya (JP); Akira Kamiya, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/561,923

(22) PCT Filed: Mar. 21, 2016

(86) PCT No.: PCT/JP2016/001619
§ 371 (c)(1),
(2) Date: Sep. 26, 2017

(87) PCT Pub. No.: WO2016/157814
PCT Pub. Date: Oct. 6, 2016

(65) Prior Publication Data
US 2018/0118223 A1 May 3, 2018

(30) Foreign Application Priority Data

Apr. 3, 2015 (JP) .................................. 2015-77084
Dec. 14, 2015 (JP) ................................ 2015-243353

(51) Int. Cl.
*B60Q 1/00* (2006.01)
*B60W 50/14* (2012.01)
(Continued)

(52) U.S. Cl.
CPC ............. *B60W 50/14* (2013.01); *B60K 35/00* (2013.01); *B60K 31/00* (2013.01);
(Continued)

(58) Field of Classification Search
CPC ...................................................... B60W 50/14
(Continued)

(56) References Cited

U.S. PATENT DOCUMENTS

2007/0057765 A1* 3/2007 Ogino ................... B60R 25/245
340/5.61
2008/0252466 A1* 10/2008 Yopp ..................... B60K 28/066
340/576
(Continued)

FOREIGN PATENT DOCUMENTS

JP 2008-305319 A 12/2008
JP 2009-262581 A 11/2009
(Continued)

*Primary Examiner* — Santiago Garcia
(74) *Attorney, Agent, or Firm* — Knobbe, Martens, Olson & Bear, LLP

(57) ABSTRACT

A startup suggestion device that is mounted on a vehicle together with a driving support device for assisting a driving operation of a driver or taking a wheel, and suggests a startup of the driving support device to the driver, includes: a state value acquisition unit that acquires a state value indicative of a traveling state of the vehicle; a preference value acquisition unit that acquires a preference value reflecting the traveling state preferred by the driver; and a startup suggestion unit that suggests the startup of the driving support device according to a comparison between the state value and the preference value.

21 Claims, 27 Drawing Sheets

(51) Int. Cl.
  *B60K 35/00* (2006.01)
  *B60K 31/00* (2006.01)

(52) U.S. Cl.
  CPC ............... *B60K 2350/2052* (2013.01); *B60W 2050/146* (2013.01); *B60W 2520/10* (2013.01); *B60Y 2400/3015* (2013.01); *B60Y 2400/3017* (2013.01)

(58) Field of Classification Search
  USPC ........................................................ 340/439
  See application file for complete search history.

(56) References Cited

U.S. PATENT DOCUMENTS

| | | | |
|---|---|---|---|
| 2009/0265071 A1* | 10/2009 | Isaji | B60W 30/16 701/70 |
| 2010/0274435 A1* | 10/2010 | Kondoh | B60W 40/09 701/31.4 |
| 2012/0022716 A1 | 1/2012 | Kitahama et al. | |
| 2012/0022719 A1 | 1/2012 | Kitahama et al. | |
| 2012/0140074 A1* | 6/2012 | Taguchi | B60R 1/06 348/148 |
| 2013/0325478 A1 | 12/2013 | Matsumoto et al. | |
| 2014/0139341 A1* | 5/2014 | Green | B60K 28/06 340/576 |
| 2014/0371948 A1* | 12/2014 | Yang | B60W 50/0098 701/1 |
| 2015/0032290 A1* | 1/2015 | Kitahama | G01C 21/34 701/1 |
| 2015/0039186 A1* | 2/2015 | Okuda | B60W 50/14 701/41 |
| 2015/0175168 A1* | 6/2015 | Hoye | B60W 40/09 434/64 |
| 2016/0009295 A1* | 1/2016 | Chun | A61B 5/6893 701/32.9 |
| 2016/0059856 A1* | 3/2016 | Van Dan Elzen | B60W 50/14 701/42 |
| 2016/0103449 A1* | 4/2016 | Desnoyer | B60W 30/12 701/23 |
| 2016/0236712 A1* | 8/2016 | Shirakata | G08B 21/06 |
| 2016/0355190 A1* | 12/2016 | Omi | B60W 30/12 |
| 2018/0009442 A1* | 1/2018 | Spasojevic | G08G 1/096833 |

FOREIGN PATENT DOCUMENTS

| | | |
|---|---|---|
| JP | 2010-198578 A | 9/2010 |
| JP | 2013-242763 A | 12/2013 |
| WO | 2009/013816 A1 | 1/2009 |

* cited by examiner

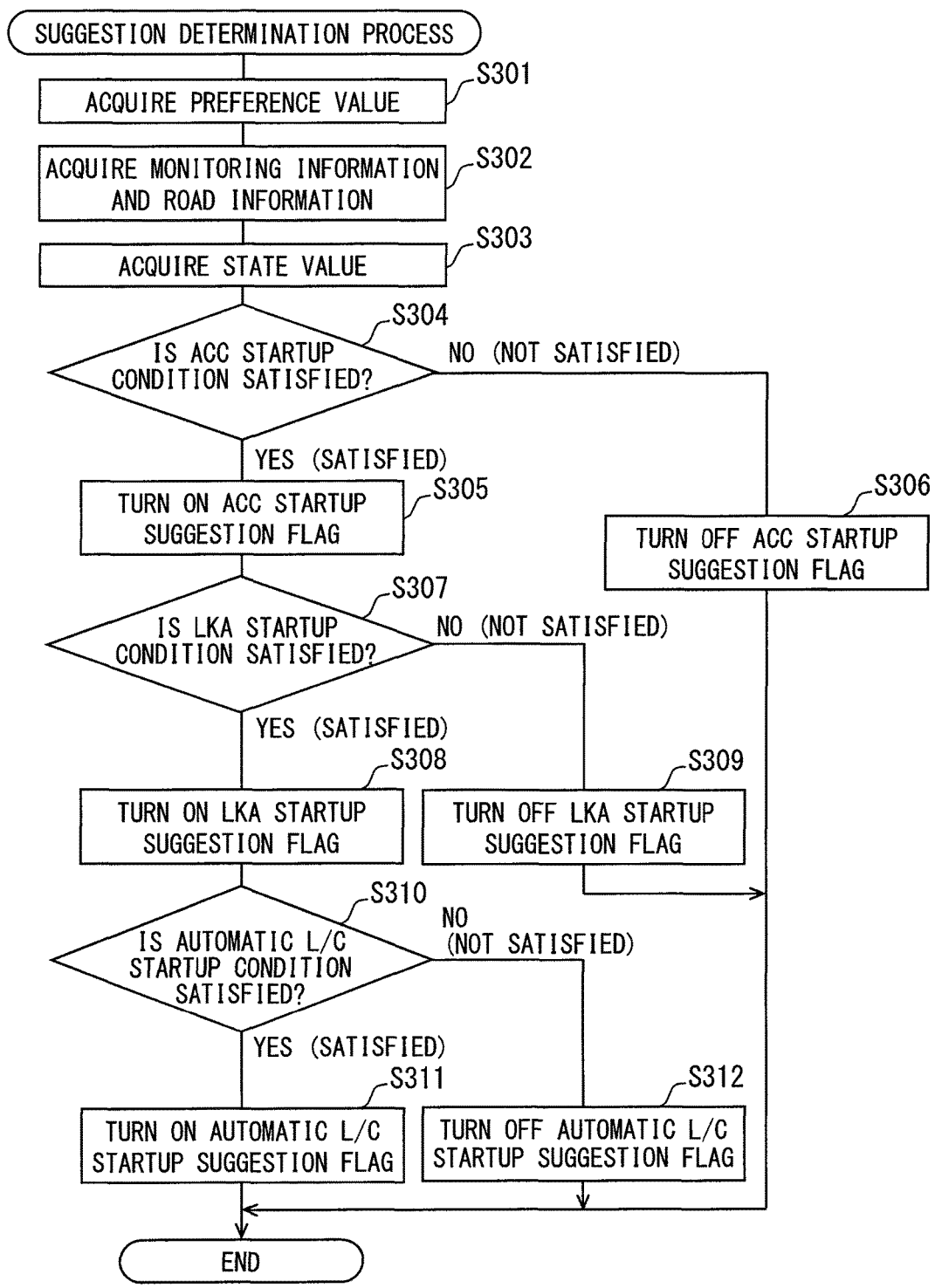

STARTUP SUGGESTION DEVICE AND STARTUP SUGGESTION METHOD

CROSS REFERENCE TO RELATED APPLICATIONS

This application is based on Japanese Patent Applications No. 2015-77084 filed on Apr. 3, 2015, and No. 2015-243353 filed on Dec. 14, 2015, the disclosures of which are incorporated herein by reference.

TECHNICAL FIELD

The present disclosure relates to a startup suggestion device and a startup suggestion method that suggest the startup of a driving support device to a driver.

BACKGROUND ART

Conventionally, there have been known driving support devices which support driving by a driver such as an adaptive cruise control (ACC) control device and a lane keeping assist (LKA) device. Patent Literature 1 discloses a driving support device guide system which guides the startup of a driving support device to a driver when the current traveling state satisfies an operation condition for such a driving support device. In this driving support device guide system, in order to reduce inconvenience for the driver, when a driving support device guided by the system is not used by the driver, the guide of the driving support device is not performed from the next time even when the operation condition is satisfied.

In the driving support device guide system of Patent Literature 1, when the driver rejects the guide of a driving support device, for example, the guide for starting up the driving support device is not performed even under the condition where the driver is forced to travel in a stressful state. As a result, the driving support device remains unused, and the effectiveness of the driving support device which reduces the stress of the driver may not be sufficiently exhibited.

PRIOR ART LITERATURES

Patent Literature

Patent Literature 1: JP-2008-305319-A

SUMMARY OF INVENTION

It is an object of the present disclosure to provide a startup suggestion device and a startup suggestion method that make it possible to reduce the stress of a driver by actively operating a driving support device.

According to a first aspect of the present disclosure, a startup suggestion device that is mounted on a vehicle together with a driving support device for assisting a driving operation of a driver or taking a wheel, and suggests a startup of the driving support device to the driver, includes: a state value acquisition unit that acquires a state value indicative of a traveling state of the vehicle; a preference value acquisition unit that acquires a preference value reflecting the traveling state preferred by the driver; and a startup suggestion unit that suggests the startup of the driving support device according to a comparison between the state value and the preference value.

It is possible to estimate or assume whether the current or future traveling state is a traveling state preferred by the driver by comparing a state value indicating the traveling state and a preference value reflecting the traveling state preferred by the driver as performed in the above startup suggestion device. Thus, when the startup of the driving support device is suggested on the basis of the state value and the preference value, the driving support device is started up under a stressful condition for the driver, and can appropriately support or substitute the driver. As described above, the startup suggestion device and the startup suggestion method can reduce the stress of the driver by actively operating the driving support device.

According to a second aspect of the present disclosure, a startup suggestion method for suggesting a startup of a driving support device to a driver in a vehicle that includes the driving support device for assisting a driving operation of a driver or taking a wheel, includes: acquiring a state value indicative of a traveling state of the vehicle; acquiring a preference value reflecting the traveling state preferred by the driver; and suggesting the startup of the driving support device to the driver according to a comparison between the state value and the preference value. The acquiring of the state value, the acquiring of the preference value, and the suggesting of the startup of the driving support device are executed by at least one processor.

It is possible to estimate or assume whether the current or future traveling state is a traveling state preferred by the driver by comparing a state value indicating the traveling state and a preference value reflecting the traveling state preferred by the driver as performed in the above startup suggestion method. Thus, when the startup of the driving support device is suggested on the basis of the state value and the preference value, the driving support device is started up under a stressful condition for the driver, and can appropriately support or substitute the driver. As described above, the startup suggestion device and the startup suggestion method can reduce the stress of the driver by actively operating the driving support device.

BRIEF DESCRIPTION OF DRAWINGS

The above and other objects, features and advantages of the present disclosure will become more apparent from the following detailed description made with reference to the accompanying drawings. In the drawings:

FIG. 33 is a flowchart illustrating a suggestion determination process according to a third embodiment.

EMBODIMENTS

Hereinbelow, a plurality of embodiments of the present disclosure will be described with reference to the drawings. Note that corresponding elements in the respective embodiments may be denoted by the same reference signs to avoid repetitive description. In each of the embodiments, when only a part of a configuration is described, a configuration of the other preceding embodiments can be applied to the other part of the configuration. Further, in addition to a combination of configurations clearly stated in each of the embodiments, configurations of a plurality of embodiments may be partially combined even if not clearly stated unless there is an obstacle in the combination. Further, a combination of configurations described in a plurality of embodiments and modifications which is not clearly stated is also disclosed by the following description.

First Embodiment

Figure 1:
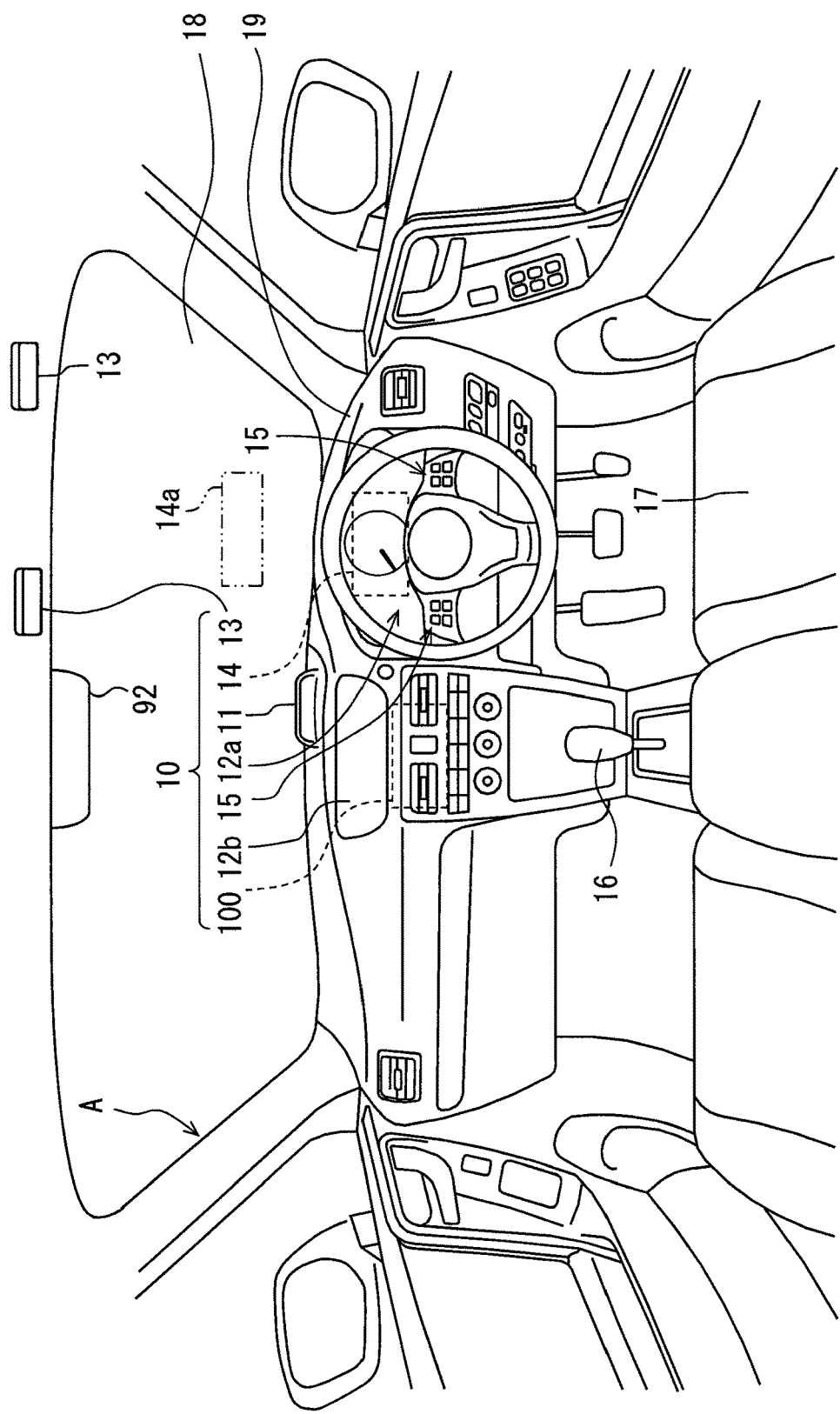
FIG. 1 is a diagram illustrating a layout around a driver's seat in an own vehicle.
Figure 2:
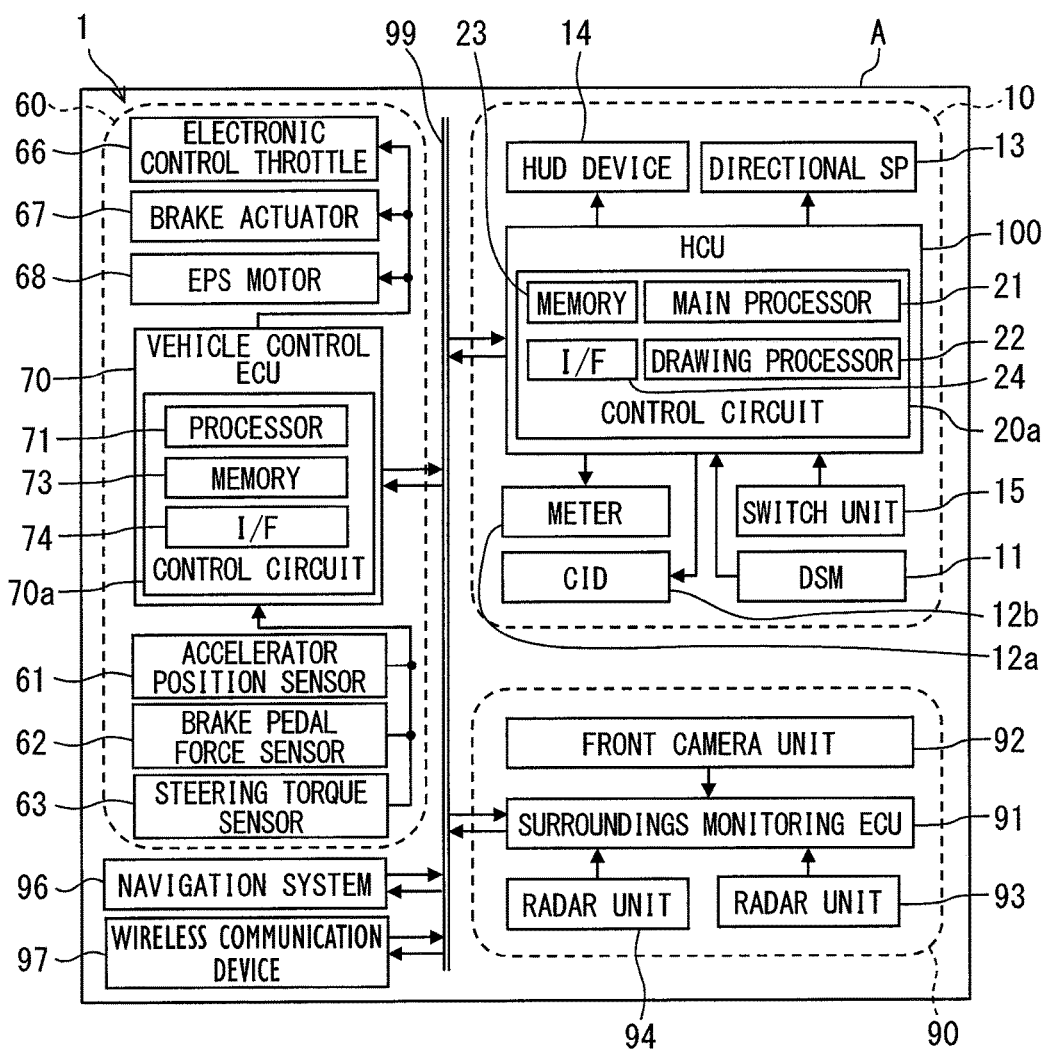
FIG. 2 is a block diagram illustrating an entire configuration of an in-vehicle network.

A human machine interface (HMI) control unit (HCU) 100 of a first embodiment to which the present disclosure is applied is an electronic device which is mounted on an own vehicle A as illustrated in FIGS. 1 and 2. The HCU 100 is one of a plurality of nodes provided in an in-vehicle network 1. The in-vehicle network 1 includes a navigation system 96, a wireless communication device 97, an external recognition system 90, a vehicle control system 60, a display system 10, and a communication bus 99 to which the navigation system 96, the wireless communication device 97, the external recognition system 90, the vehicle control system 60, and the display system 10 are connected.

The navigation system 96 is provided with a GNSS receiver, inertial sensors such as a gyroscopic sensor and an acceleration sensor, and a storage medium such as a flash memory which stores map data and functions as a map database. The global navigation satellite system (GNSS) receiver receives positioning signals from a plurality of artificial satellites such as GPS satellites. The navigation system 96 measures the current position of the own vehicle A by combining the positioning signals received by the GNSS receiver with a result of measurement by the inertial sensors.

When a destination is input by a driver, the navigation system 96 reads map data to the destination from the measured current position from the map database and calculates a route to the destination from the current position. Route information to the destination set by the navigation system 96 is output to the display system 10 together with positional information of the own vehicle A and map data around the current position through the communication bus 99.

Figure 24:
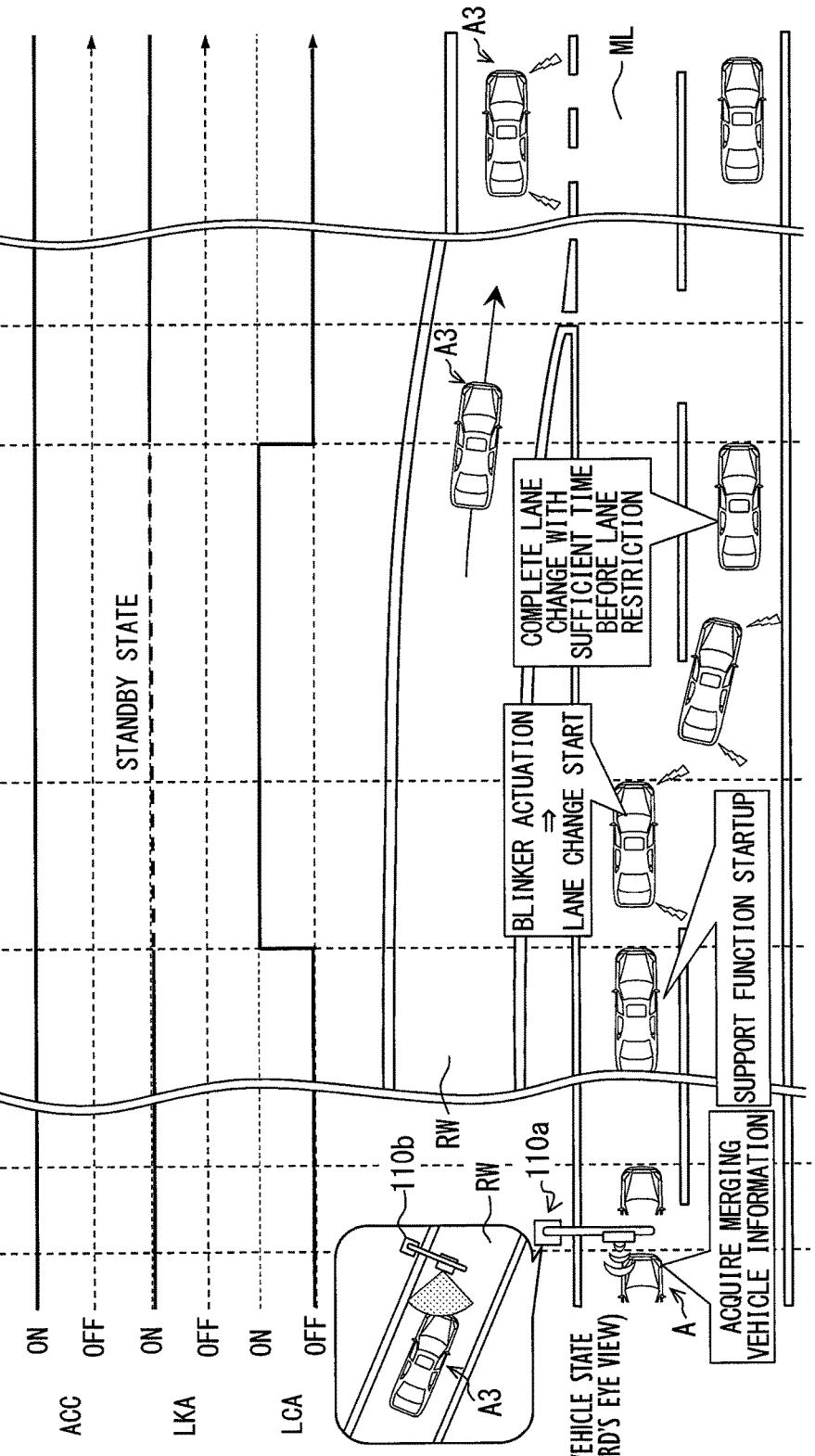
FIG. 24 is a time chart for describing the process relating to the startup suggestion based on estimation of the occurrence of a deviation assumed scene relating to a merging point.

The wireless communication device 97 is an in-vehicle device for vehicle to X (V2X) which enables wireless commination between the own vehicle A and the outside. The wireless communication device 97 is connected to the communication bus 99 and an antenna for wireless communication. The wireless communication device 97 is capable of receiving, for example, FM multiplexing broadcasting. In addition, the wireless communication device 97 is capable of performing road-to-vehicle communication with a roadside device 110a (refer to FIG. 24) which is installed beside a road by wireless communication using a radio beacon and an optical beacon. For example, the wireless communication device 97 is capable of receiving traffic jam information and traffic restriction information as VICS (registered trademark) information by road-to-vehicle communication. Further, the wireless communication device 97 is capable of performing vehicle-to-vehicle communication by wireless communication with an in-vehicle communication device of another vehicle which is located around the own vehicle A. The wireless communication device 97 receives various pieces of road information relating to a road where the own vehicle A travels from another vehicle and the roadside device 110a and outputs the received road information to the communication bus 99.

The external recognition system 90 is provided with a front camera unit 92, external sensors such as radar units 93, 94, and a surroundings monitoring ECU 91. The external recognition system 90 detects moving objects such as a pedestrian, an animal other than a human, a bicycle, a motorcycle, and another vehicle and also stationary objects such as a fallen object on a road, a traffic light, a guard rail, a curb, a road sign, a road marking, a lane marking, and a tree. The external recognition system 90 can be provided with external sensors such as a lidar and a sonar in addition to the units 92 to 94.

The front camera unit 92 is, for example, a monocular or compound-eye camera which is installed near a rearview mirror of the own vehicle A. The front camera unit 92 is directed in a traveling direction of the own vehicle A and, for example, capable of capturing an image of a range of approximately 80 meters from the own vehicle A at a horizontal viewing angle of approximately 45 degrees. The front camera unit 92 successively outputs data of captured images including a moving object and a stationary object to the surroundings monitoring ECU 91.

The radar unit 93 is installed in, for example, a front part of the own vehicle A. The radar unit 93 emits a 77 GHz band millimeter wave toward the traveling direction of the own vehicle A from a transmission antenna. The radar unit 93 receives a millimeter wave reflected by a moving object or a stationary object in the traveling direction by a reception antenna. The radar unit 93 is, for example, capable of scanning a range of approximately 60 meters from the own vehicle A at a horizontal scanning angle of approximately 55 degrees. The radar unit 93 successively outputs scanning results based on received signals to the surroundings monitoring ECU 91.

The radar unit 94 is installed in, for example, each of right and left sides of a rear part of the own vehicle A. The radar unit 94 emits a 24 GHz band submillimeter wave toward the rear lateral side of the own vehicle A from a transmission antenna. The radar unit 94 receives a submillimeter wave reflected by a moving object or a stationary object on the rear lateral side by a reception antenna. The radar unit 94 is, for example, capable of scanning a range of approximately 30 meters from the own vehicle A at a horizontal scanning angle of approximately 120 degrees. The radar unit 94 successively outputs scanning results based on received signals to the surroundings monitoring ECU 91.

The surroundings monitoring ECU 91 is mainly composed of a microcomputer which includes a processor and a memory. The surroundings monitoring ECU 91 is communicably connected to the front camera unit 92, each of the radar units 93, 94, and the communication bus 99. The surroundings monitoring ECU 91 detects, for example, a relative position of a moving object or a stationary object (hereinbelow, referred to as a "detected object") which is present in the traveling direction by integrating information items acquired from the respective units 92, 93. In addition, the surroundings monitoring ECU 91 detects a relative position of a detected object which is present on the rear lateral side from information acquired from the radar unit 94. The surroundings monitoring ECU 91 determines whether a lane change to an adjacent lane can be made on the basis of detection information of a parallelly traveling vehicle A2 which travels in the adjacent lane (refer to FIG. 12), specifically, a relative position and a relative speed of the parallelly traveling vehicle A2. The surroundings monitoring ECU 91 outputs such monitoring information relating to a detected object around the own vehicle A to the communication bus 99.

The vehicle control system 60 is provided with detection sensors which detect a driving operation including an accelerator position sensor 61, a brake pedal force sensor 62 and a steering torque sensor 63, and a vehicle speed sensor 64 which detects a traveling speed of the own vehicle A. In addition, the vehicle control system 60 is provided with traveling control devices including an electronic control throttle 66, a brake actuator 67 and an electric power steering (EPS) motor 68, and a vehicle control ECU 70. The vehicle control system 60 controls traveling of the own vehicle A on the basis of a driving operation by the driver and monitoring information by the external recognition system 90.

The accelerator position sensor 61 detects the amount by which an accelerator pedal is depressed by the driver and outputs the detected amount to the vehicle control ECU 70. The brake pedal force sensor 62 detects a brake pedal force depressed by the driver and outputs the detected force to the vehicle control ECU 70. The steering torque sensor 63 detects a steering torque of a steering by the driver and outputs the detected steering torque to the vehicle control ECU 70. The vehicle speed sensor 64 detects the current traveling speed of the own vehicle A and outputs the detected current traveling speed to the vehicle control ECU 70.

The electronic control throttle 66 controls the degree of opening of a throttle on the basis of a control signal output from the vehicle control ECU 70. The brake actuator 67 controls a braking force generated in each wheel by generating a brake pressure based on a control signal output from the vehicle control ECU 70. The EPS motor 68 controls a steering force and a steering retention force which are applied to a steering mechanism on the basis of a control signal output from the vehicle control ECU 70.

The vehicle control ECU 70 includes one or more kinds selected from a power unit control ECU, a brake control ECU, and an integrated control ECU, and includes at least the integrated control ECU. A control circuit 70a of the vehicle control ECU 70 includes a processor 71, a rewritable nonvolatile memory 73, an input/output interface 74 which inputs/outputs information, and a bus which connects the processor 71, the memory 73, and the input/output interface 74. The vehicle control ECU 70 is connected to each of the sensors 61 to 63 and each of the traveling control devices. The vehicle control ECU 70 acquires a detection signal output from each of the sensors 61 to 63 and outputs the acquired detection signal to each of the traveling control devices. In addition, the vehicle control ECU 70 is connected to the communication bus 99 and capable of communicating with the HCU 100 and the surroundings monitoring ECU 91.

Figure 3:
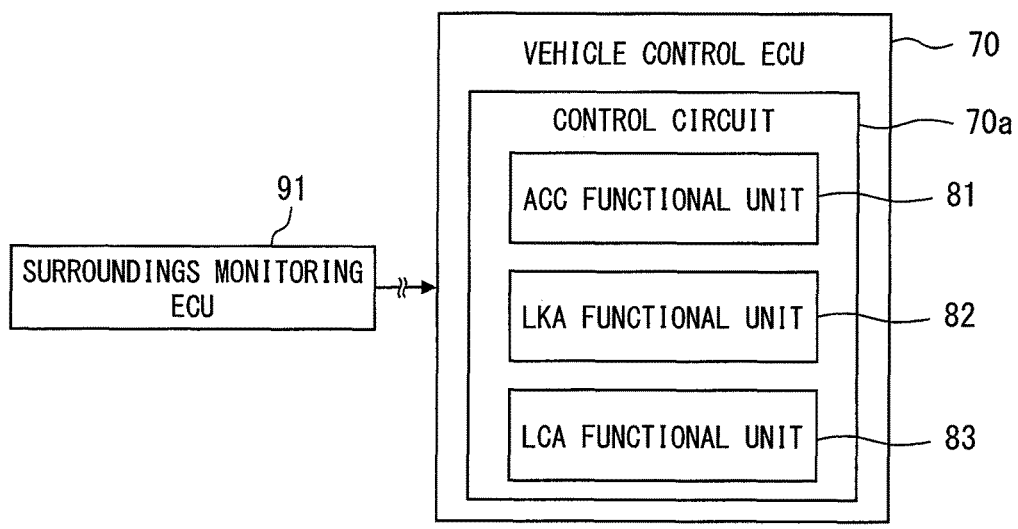
FIG. 3 is a diagram illustrating functional blocks constructed in a control circuit of a vehicle control ECU.

The vehicle control ECU 70 includes a plurality of driving support functions which support and substitute a driving operation by the driver by controlling a driving force, a braking force, and a steering force of the own vehicle A. The vehicle control ECU 70 executes a program stored in the memory 73 by the processor 71 to construct a plurality of functional blocks (81 to 83) which implement the driving support functions as illustrated in FIG. 3.

Figure 6:
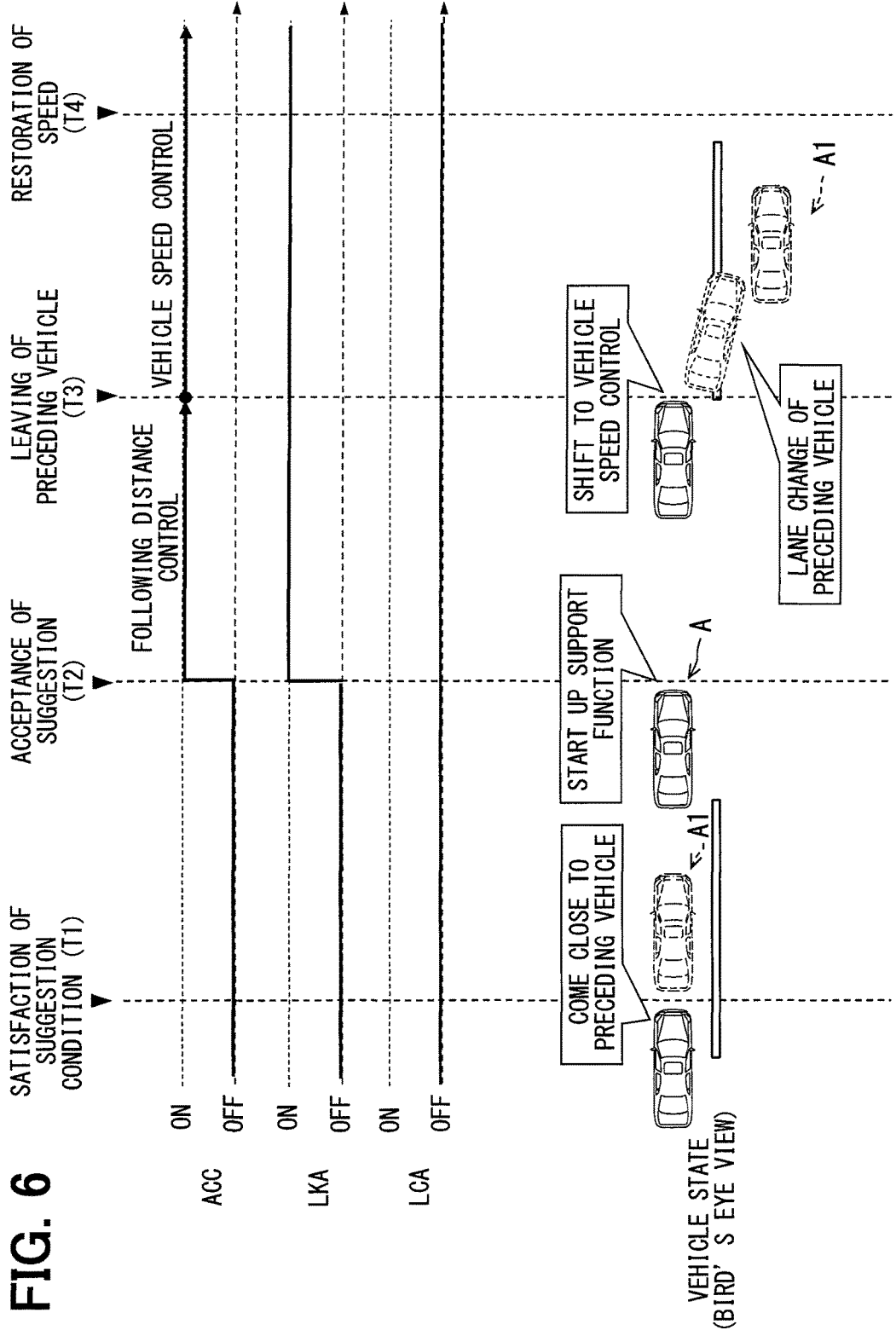
FIG. 6 is a time chart for describing the process relating to the suggestion of the startup of ACC and LKA.

The ACC functional unit 81 implements the function of adaptive cruise control (ACC) for controlling the traveling speed of the own vehicle A by adjusting the driving force and the braking force on the basis of detection information (monitoring information) of a preceding vehicle A1 which is acquired from the surroundings monitoring ECU 91 (refer to FIG. 6). When the preceding vehicle A1 is not detected, the ACC functional unit 81 causes the own vehicle A to travel at a target speed which is set by the driver. On the other hand, when the preceding vehicle A1 is detected, the ACC functional unit 81 causes the own vehicle A to travel following the preceding vehicle A1 while maintaining the distance from the preceding vehicle A1.

An LKA functional unit 82 implements the function of lane keeping assist (LKA) for controlling a steering angle of a steering wheel of the own vehicle A (refer to FIG. 6) by adjusting the steering force on the basis of shape information of a lane marking in the traveling direction which is acquired from the surroundings monitoring ECU 91. The LKA functional unit 82 keeps the own vehicle A inside the current traveling lane and causes the own vehicle A to travel along the lane by generating a steering force in the direction for preventing the own vehicle A from approaching the lane marking.

A lane change assist (LCA) functional unit 83 implements the function of automatic lane change for moving the own vehicle A (refer to FIG. 12) from the current traveling lane to an adjacent lane. The LCA functional unit 83 acquires shape information of a lane marking in the traveling direction and a result of determination of the possibility of a movement to the adjacent lane from the surroundings monitoring ECU 91. When the lane change can be performed, the LCA functional unit 83 moves the own vehicle A to the adjacent lane by generating a steering force in the direction toward the adjacent lane.

The display system 10 illustrated in FIGS. 1 and 2 is provided with a display device such as an HUD device 14, a directional speaker 13, an operation device such as a switch unit 15, and a driver status monitor (DSM) 11. In addition, the display system 10 is provided with the HCU 100. The display system 10 provides various pieces of information such as route guide to a destination which is set in the navigation system 96 to occupants of the own vehicle A including the driver seated on a driver's seat 17. The display system 10 can be further provided with a combination meter 12a and a center information display (CID) 12b as display devices.

A head-up display (HUD) device 14 projects light of an image based on data acquired from the HCU 100 onto a projection area 14a which is defined by a windshield 18. Light of the image reflected by the windshield 18 toward the inside of a vehicle cabin is perceived by the driver seated on the driver's seat 17. The driver can visually recognize a virtual image of the image projected by the HUD device 14 which is superimposed on outside scenery ahead of the own vehicle A.

A pair of directional speakers 13 is installed above the windshield 18 in front of the driver's seat 17 inside the vehicle cabin of the own vehicle A. Each of the directional speakers 13 outputs an ultrasonic wave having high directivity toward the vicinity of a headrest of the driver's seat 17. The directional speaker 13 generates an audible sound by distortion which is generated in an ultrasonic wave propagating in the air. The directional speaker 13 is capable of sending sound only to the driver who is seated on the driver's seat 17 among the occupants of the own vehicle A. Note that the installation position of the directional speaker 13 can be appropriately changed to any position where the directional speaker 13 can directly emit an ultrasonic wave toward the vicinity of the headrest. The directional speaker 13 can be installed, for example, on the base of a pillar which is located at the lateral side of the windshield 18.

The switch unit 15 is disposed on a spoke part of a steering wheel. The switch unit 15 includes a plurality of pressing buttons. The driver inputs an operation for changing setting of the display system 10 and the vehicle control system 60 to each of the pressing buttons. The switch unit 15 outputs an operation signal input to each of the pressing buttons to the HCU 100.

The DSM 11 is provided with a near-infrared light source, a near-infrared camera, and a control unit which controls the near-infrared light source and the near-infrared camera. The DSM 11 is disposed on the upper face of an instrument panel 19 with the near-infrared camera facing the driver's seat 17. The DSM 11 captures an image of the face of the driver irradiated with near infrared light by the near-infrared light source using the near-infrared camera. The image captured by the near-infrared camera is subjected to image analysis by the control unit. The control unit extracts, for example, the direction of the face and the opening degree of the eyes of the driver from the captured image. When the DSM 11 detects a state in which the driver does not face the front or the driver closes his/her eyes, the DSM 11 outputs a detection signal indicating an abnormality of the driver to the HCU 100.

The HCU 100 is connected to each of the display devices, the directional speaker 13, each of the operation devices, and the DSM 11. The HCU 100 acquires an operation signal output from the operation device and a detection signal output from the DSM 11. The HCU 100 outputs a control signal to each of the display devices to control display by these display devices. A control circuit 20a of the HCU 100 includes a main processor 21, a drawing processor 22, a rewritable nonvolatile memory 23, an input/output interface 24 which performs input and output of information, and a bus which connects the main processor 21, the drawing processor 22, the rewritable nonvolatile memory 23, and the input/output interface 24.

In addition, the HCU 100 is capable of suggesting the actuation of the driving support functions under conditions where a stressful traveling state is forced on the driver and it is predicted that a stressful driving state is forced on the driver. In order to implement such a startup suggestion, the control circuit 20a of the HCU 100 executes a startup suggestion program stored in the memory 23 by each of the processors 21, 22 to construct a plurality of functional blocks (31 to 39) illustrated in FIG. 4. Hereinbelow, details of the functional blocks relating to the driving support function startup suggestion will be described with reference to FIG. 4, and further, to FIGS. 1 to 3.

A state value acquisition unit 31 acquires a state value which indicates the current traveling state of the own vehicle A and an another-vehicle state value which indicates a traveling state of another vehicle which travels around the own vehicle A. The another-vehicle state value is calculated by a monitoring information acquisition unit 34 (described below) or the state value acquisition unit 31 on the basis of monitoring information relating to another vehicle which is detected by the surroundings monitoring ECU 91 and acquired by the monitoring information acquisition unit 34.

A preference value acquisition unit 32 acquires a preference value which reflects a traveling state preferred by the driver. The traveling state which is acquired as the state value of the own vehicle A, the another-vehicle state value, and the preference value includes, for example, the traveling speed of the own vehicle A, an acceleration/deceleration speed in the front-rear direction and the right-left direction, a jerk, the distance from the preceding vehicle A1 (refer to FIG. 6), a traveling position inside the lane, and a traveling distance required for a lane change.

A preference value setting unit 33 sets a preference value which is acquired by the preference value acquisition unit 32. The preference value setting unit 33 is capable of learning a past traveling state of the own vehicle A driven by the driver and setting the preference value on the basis of the learned traveling state. Specifically, the preference value setting unit 33 calculates the difference between a traveling speed in the past travel and a speed limit of a road where the vehicle has traveled. The preference value setting unit 33 sets the preference value by adding the difference learned in this manner to a speed limit of a road where the vehicle is currently traveling.

A method for setting the preference value in the preference value setting unit 33 is not limited to learning as described above and can be appropriately changed. For example, the preference value setting unit 33 is capable of setting preference values for the traveling speed and the following distance for each road type such as an ordinary road, an expressway, or a narrow backstreet on the basis of the learned past traveling state. Further, the preference value setting unit 33 is capable of setting the preference value for each section of a road by storing a traveling state in the past travel in association with positional information. Further, the preference value setting unit 33 is capable of setting values of a traveling speed and a following distance which are input by the driver as the preference values.

The monitoring information acquisition unit 34 acquires monitoring information around the own vehicle A monitored by the surroundings monitoring ECU 91. Specifically, the monitoring information acquisition unit 34 is capable of acquiring detection information of a relative position and a relative speed relating to the preceding vehicle A1 which travels ahead of the own vehicle A (refer to FIG. 6) and the parallelly traveling vehicle A2 which travels in an adjacent lane (refer to FIG. 12) as monitoring information. In addition, the monitoring information acquisition unit 34 is capable of acquiring a result of the determination of the possibility of a lane change to the adjacent lane from the surroundings monitoring ECU 91 as monitoring information.

An attention determination unit 35 acquires a detection signal of the driver by the DSM 11. The attention determination unit 35 determines a reduction in the attention of the driver on the basis of the detection signal. Specifically, the attention determination unit 35 determines that the attention is reduced when the direction of the face of the driver is out of the traveling direction. Note that a method for determining a reduction in the attention can be appropriately changed.

A scene estimation unit 39 estimates the occurrence of a deviation assumed scene in advance. The deviation assumed scene includes a plurality of previously-assumed driving scenes in which the state value of the own vehicle A easily deviates from the preference value. There is a driving scene, as an example of the deviation assumed scene, which requires a lane change to select a route set by the navigation system 96 at a branch point. Further, a driving scene which requires a lane change when it is impossible to travel in the current traveling lane due to road repairing or a disabled vehicle and there is a vehicle which is going to merge at a merging point ahead (refer to A3 of FIG. 24) also corresponds to the deviation assumed scene. The scene estimation unit 39 acquires route information and positional information which are output from the navigation system 96 and road information which is output from the wireless communication device 97. The scene estimation unit 39 estimates whether the deviation assumed scene occurs in the future using the route information, the positional information, and the road information.

A startup suggestion unit 36 suggests the startup of the driving support function to the driver on the basis of a deviation between a state value acquired by the state value acquisition unit 31 and a preference value acquired by the preference value acquisition unit 32. Specifically, the startup suggestion unit 36 suggests the startup of ACC and LKA by the ACC functional unit 81 and the LKA functional unit 82 to the driver when there is a deviation between a preference value and a state value for the traveling speed. Further, the startup suggestion unit 36 suggests the startup of LKA by the LKA functional unit 82, for example, when a large vehicle travels in an adjacent lane and there is a deviation between a preference value and a state value for the traveling position inside a lane. Further, the startup suggestion unit 36 suggests the startup of automatic lane change by the LCA functional unit 83 to the driver when there is a deviation between the preference value and the state value for the traveling speed in a state in which the ACC functional unit 81 and the LKA functional unit 82 are active.

In addition, the startup suggestion unit 36 suggests the startup of the driving support function to the driver on the basis of monitoring information which is acquired in the monitoring information acquisition unit 34. The startup suggestion unit 36 estimates a future state value in the own vehicle A from the latest state value of the own vehicle A and a latest another-vehicle state value of another vehicle which are acquired in the state value acquisition unit 31. The startup suggestion unit 36 can suggest the startup of a driving support device to the driver when there is a deviation between the estimated future state value and the preference value.

Further, also when the occurrence of the deviation assumed scene has been estimated in the scene estimation unit 39, the startup suggestion unit 36 can consider the future state value to deviate from the preference value and suggest the startup of the driving support device to the driver. In these cases, the startup suggestion unit 36 suggests the startup of the driving support function that prevents the occurrence of the estimated deviation assumed scene.

The startup suggestion unit 36 is capable of suggesting the startup of the driving support function to the driver using a notification sound and a suggestion voice which are output toward the driver from the directional speaker 13 and a suggestion image 50 (refer to FIGS. 8 and 14) which is projected onto the projection area 14a from the HUD device 14. The startup suggestion by the startup suggestion unit 36 is performed when monitoring information has been acquired by the monitoring information acquisition unit 34 and not performed when no monitoring information has been acquired. The startup suggestion unit 36 can stop the suggestion of the startup of the driving support function when the attention determination unit 35 determines that the attention of the driver is reduced.

An operation acquisition unit 37 acquires an accepting operation for accepting the driving support function startup suggestion and a rejecting operation for rejecting the driving support function startup suggestion. The accepting operation is, for example, an operation of pressing the pressing button of "Yes" which is provided in the switch unit 15. The rejecting operation is, for example, an operation of pressing the pressing button of "No" which is provided in the switch unit 15.

A function control unit 38 controls the startup of each of the functional units 81 to 83. When the operation acquisition unit 37 acquires an accepting operation, the function control unit 38 outputs command information for providing an instruction for the startup of the driving support function suggested by the startup suggestion unit 36 to the vehicle control ECU 70 through the communication bus 99 (refer to FIG. 2). The vehicle control ECU 70 starts the operation of the driving support function on the basis of the command information acquired from the communication bus 99.

The function control unit 38 is capable of setting a control value in the driving support function by output of command information to the vehicle control ECU 70 on the basis of the preference value acquired by the preference value acquisition unit 32. Specifically, a target speed of the own vehicle A which travels at a constant speed by the operation of ACC is set on the basis of the preference value for the traveling speed. In addition, the traveling position of the own vehicle A inside the lane which is maintained by the operation of LKA is set on the basis of the preference value relating to the traveling position. Further, the travel distance which is spent for a lane change in automatic lane change is set on the basis of the preference value relating to the travel distance.

A series of processes of suggesting the startup of the driving support function to the driver by the configuration described above and then controlling the own vehicle A by the driving support function on the basis of an accepting operation by the driver will be described. First, a process of starting up ACC and LKA during manual driving will be described with reference to time charts illustrated in FIGS. 5 and 6, and further, to FIG. 2.

When the driver decelerates the own vehicle A due to a blockage in the traveling direction by the preceding vehicle A1, a deviation between the traveling speed of the own vehicle A and a preference value of the driver for the traveling speed is expanded. When the current traveling speed deviates by a predetermined threshold speed (e.g., 10 km/h) or more from the preference value (T1), the startup of ACC and LKA is suggested. The startup suggestion is performed using display of the suggestion image 50 (refer to FIG. 7) which is projected by the HUD device 14, and a notification sound and a suggestion voice by the directional speaker 13.

The notification sound is a sound for notifying the driver of start of the startup suggestion. The notification sound guides the driver's attention to the sound to reduce failure by the driver to hear the suggestion voice which is reproduced after the notification sound. The suggestion voice is reproduced after the notification sound to notify the driver of contents of the startup suggestion. The suggestion voice is, for example, a voice for asking the driver a question such as "Will you start cruise control (or following travel)?"

When the driver inputs an accepting operation for accepting the startup suggestion (T2), ACC and LKA as the driving support functions are started up. As a result, the own vehicle A starts following travel with respect to the preceding vehicle A1 by following distance control of ACC. At this time, the HUD device 14 displays a status image 51 (refer to FIG. 9). Further, the directional speaker 13 sequentially reproduces a notification voice which notifies the driver of the start of control by the driving support functions and a notification voice which notifies the driver of the completion of setting of the driving support functions. The notification voice for the control start is, for example, a voice which notifies the driver of contents such as "Starting cruise control (or following travel)." The notification voice for the setting completion is, for example, a voice which notifies the driver of contents such as "Setting of cruise control (following travel) has been completed."

When the ACC has lost the preceding vehicle A1 due to a lane change of the preceding vehicle A1 to an adjacent lane, the ACC functional unit 81 (refer to FIG. 3) switches a control mode from the following distance control to vehicle speed control (T3). As a result, the own vehicle A starts accelerating to a target speed which is set on the basis of the preference value. When the traveling speed of the own vehicle A is restored to the target speed (T4), ACC causes the own vehicle A to travel at the constant target speed.

Details of each image which is projected by the HUD device 14 in the above series of processes will be described with reference to FIGS. 7 to 10. The HUD device 14 is capable of projecting the suggestion image 50 and the status image 51, a vehicle speed display 53, a notification ring 55 and an operation guide 56, and a plurality of indicators 52a, 52b onto the projection area 14a.

Figure 5:
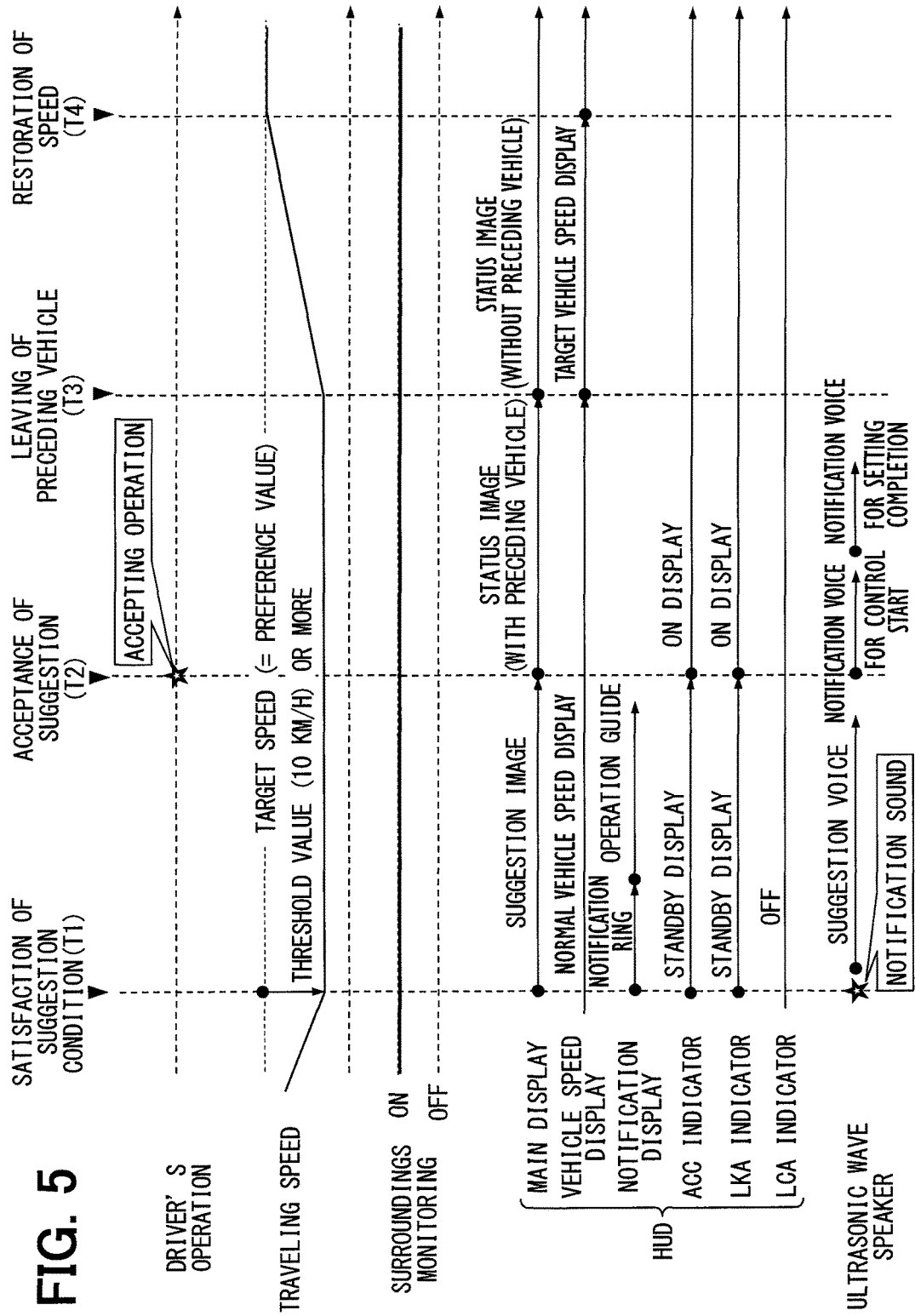
FIG. 5 is a time chart for describing a process relating to a suggestion of the startup of ACC and LKA.
Figure 7:
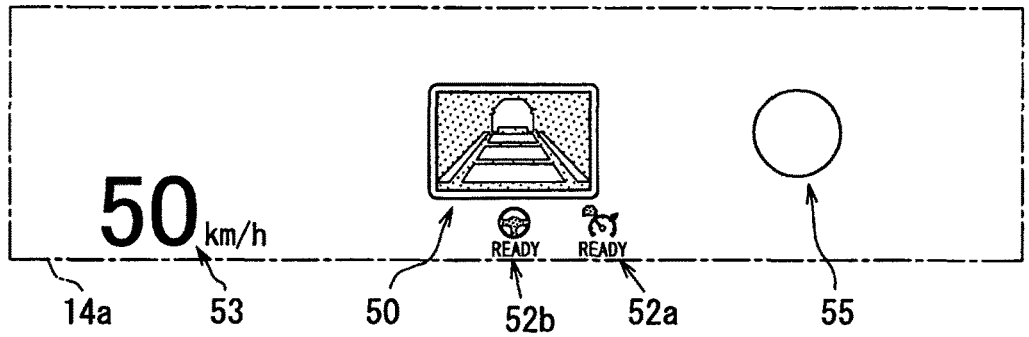
FIG. 7 is a diagram illustrating a suggestion image which performs the suggestion of the startup of CC and LKA.

FIG. 7 illustrates display of the projection area 14a when the startup suggestion condition is satisfied (refer to T1 of FIG. 5). At this time, the suggestion image 50, the ACC indicator 52a, the LKA indicator 52b, and the notification ring 55 are displayed in the projection area 14a in addition to the vehicle speed display 53 which indicates the current traveling speed of the own vehicle A (refer to FIG. 6).

The suggestion image 50 is displayed on the center of the projection area 14a. The suggestion image 50 is an image having a shape which includes a design obtained by reversing light and dark of the status image 51 (refer to FIG. 9) and a frame line which surrounds the outer periphery of the design. The suggestion image 50 can remind the driver of the active state of ACC and LKA by the design similar to the status image 51 to urge the driver to start up these functions.

The ACC indicator 52a and the LKA indicator 52b are displayed below the suggestion image 50. Each of the indicators 52a, 52b includes a character of "READY" to notify the driver that ACC and LKA are in a startable standby state. In addition, each of the indicators 52a, 52b periodically changes its brightness (brilliance or lightness) or periodically repeats flashing to represent the standby state.

Figure 8:
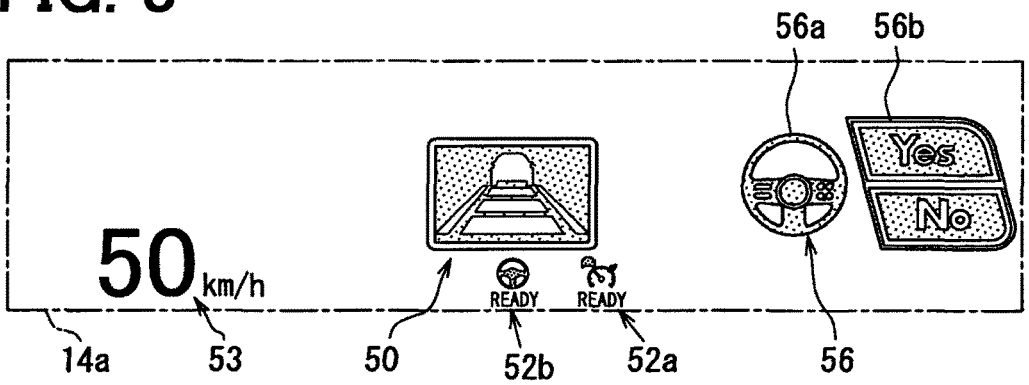
FIG. 8 is a diagram illustrating the suggestion image which performs the suggestion of the startup of ACC and LKA.

The notification ring 55 is an annular image which reminds the driver of the shape of the steering. The notification ring 55 is disposed side by side with the suggestion image 50 in the horizontal direction and located on the right side of the suggestion image 50. The notification ring 55 is displayed in conjunction with the notification sound and notifies the driver of the start of a startup suggestion. The display of the notification ring 55 is finished with the start of reproduction of the suggestion voice after the finish of the notification sound. Then, display of the operation guide 56 illustrated in FIG. 8 is started.

The operation guide 56 is an image for describing an accepting operation and a rejecting operation with respect to the startup suggestion to the driver. The operation guide 56 is displayed in the same area as the notification ring 55 (refer to FIG. 7) in the projection area 14a. The operation guide 56 includes an image portion 56a which imitates the steering and an image portion 56b which imitates the pressing buttons of "Yes" and "No". The operation guide 56 represents that the accepting operation and the rejecting operation can be performed by input to the switch unit 15 (refer to FIG. 1) which is provided in the steering. The display of the operation guide 56 is finished by the input of the accepting operation or the rejecting operation or the passage of a predetermined time (time-out).

Figure 9:
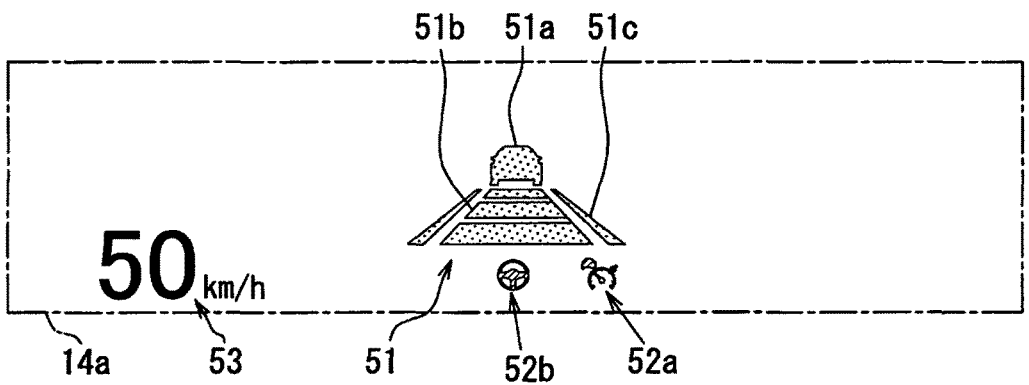
FIG. 9 is a diagram illustrating a stator image which is displayed after acceptance of the startup suggestion.

FIG. 9 illustrates display of the projection area 14a when the startup suggestion is accepted (refer to T2 of FIG. 5). At this time, the ACC indicator 52a and the LKA indicator 52b are changed from a display mode indicating the standby state of ACC and LKA to a display mode indicating the active state of ACC and LKA. Specifically, each of the indicators 52a, 52b stops the repetition of light and dark and is displayed with a constant brightness. In addition, the character of "READY" is deleted from each of the indicators 52a, 52b. Further, the display color of each of the indicators 52a, 52b is changed, for example, from white indicating the standby state to green indicating the active state.

The status image 51 is displayed on the center of the projection area 14a instead of the suggestion image 50 (refer to FIG. 7). The status image 51 is an image which represents that ACC and LKA are active. The status image 51 includes an image portion 51a which imitates the preceding vehicle A1 (refer to FIG. 6), an image portion 51b which represents the length of the following distance from the preceding vehicle A1 set in ACC, and a pair of image portions 51c which represents recognition of lane markings by LKA.

Figure 10:
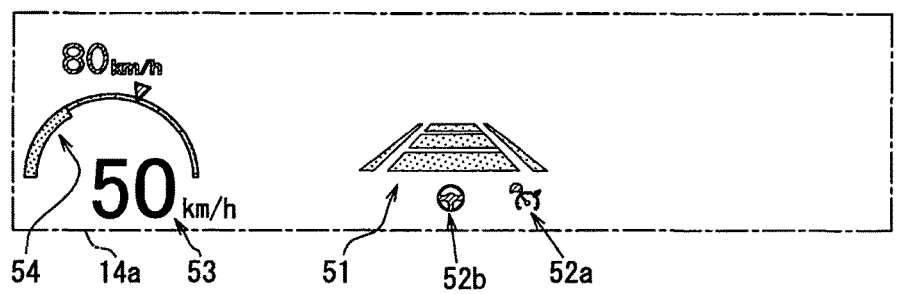
FIG. 10 is a diagram illustrating the stator image which is displayed after acceptance of the startup suggestion.

FIG. 10 illustrates display of the projection area 14a when the preceding vehicle A1 (refer to FIG. 6) has been left (refer to T3 of FIG. 5). At this time, the image portion 51a (refer to FIG. 9) which imitates the preceding vehicle A1 is deleted from the status image 51. Further, a target speed display portion 54 is added to the vehicle speed display 53. The target speed display portion 54 is located above a number which indicates the current traveling speed. The target speed display portion 54 is a bar-like image portion which extends in a semicircular arc shape surrounding the number. The target speed display portion 54 indicates the target speed which is set in ACC and the degree of attainment of the current traveling speed with respect to the target speed. When the traveling speed of the own vehicle A (refer to FIG. 6) is restored to the target speed, the display of the target speed display portion 54 is finished. Accordingly, the vehicle speed display 53 is returned to a normal display mode (refer to FIG. 7).

Next, a process of further starting up automatic lane change when ACC and LKA are active will be described with reference to time charts illustrated in FIGS. 11 and 12, and further, to FIG. 2.

When ACC decelerates the own vehicle A due to a blockage in the traveling direction by the preceding vehicle A1, the deviation between the traveling speed of the own vehicle A and the preference value of the driver for the traveling speed is expanded. When the current traveling speed deviates by a predetermined threshold speed (e.g., 10 km/h) or more from the preference value (T11), the startup of automatic lane change is suggested.

The suggestion of the startup of automatic lane change is started even when lane change impossible determination is made by the surroundings monitoring ECU 91 on the basis of detection of the parallelly traveling vehicle A2. The startup suggestion is performed using display of a suggestion image 150 which is projected by the HUD device 14 (refer to FIGS. 13 and 14) and a notification sound and a suggestion voice by the directional speaker 13. The suggestion voice which suggests the startup of automatic lane change is, for example, a voice for asking the driver a question such as "Will you move to the right adjacent lane? Press the switch of the steering to move."

When the driver inputs an accepting operation for accepting the startup suggestion (T12), automatic lane change as the driving support function is started up. At this time, lane change impossible determination is made on the basis of the existence of the parallelly traveling vehicle A2 which travels on the rear lateral side of the own vehicle A in the right adjacent lane. Thus, the start of automatic lane change is put on hold (standby state).

Figure 15:
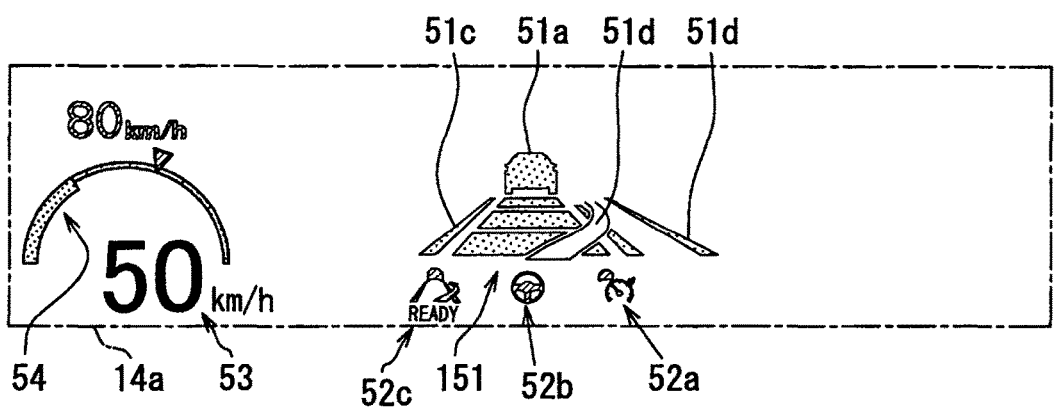
FIG. 15 is a diagram illustrating a stator image which is displayed after acceptance of the startup suggestion.

The HUD device 14 displays a status image 151 (refer to FIG. 15). Further, the directional speaker 13 sequentially reproduces a notification voice which notifies the driver of the control start by the driving support function and a notification voice which notifies the driver of the holding of the lane change start. The notification voice for the control start is, for example, a voice which notifies the driver of contents such as "Starting a lane change." The notification voice during the holding is, for example, a voice which notifies the driver of contents such as "A lane change has been put on hold due to a vehicle in a change target lane."

When the lane change impossible determination is cancelled by precedence of the parallelly traveling vehicle A2 (T13), the LCA functional unit 83 (refer to FIG. 3) changes automatic lane change from the standby state to an active state. At this time, LKA is temporarily changed from the active state to a standby state. Accordingly, the own vehicle A actuates a blinker (direction indicator lamp) in the moving direction (right side) and then starts moving to the right adjacent lane. As a result, ACC loses the preceding vehicle A1 as a target of following travel and starts acceleration of the own vehicle A to the target speed.

Figure 16:
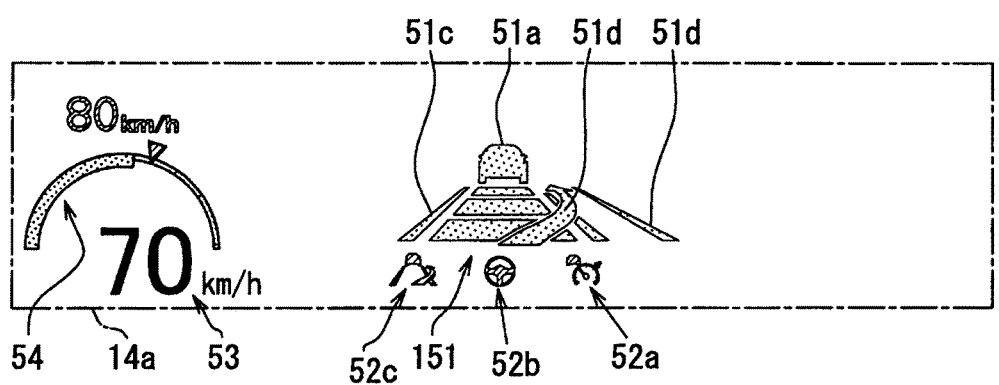
FIG. 16 is a diagram illustrating the stator image which is displayed after acceptance of the startup suggestion.

At this time, the HUD device 14 changes a display mode of the status image 151 (refer to FIG. 16). Further, the directional speaker 13 sequentially reproduces a notification voice which notifies the driver of the start of steering and a notification voice which notifies the driver of the start of acceleration. The notification voice for the steering start is, for example, a voice which notifies the driver of contents such as "Starting moving to the right lane." The notification voice for the acceleration start is, for example, a voice which notifies the driver of contents such as "Restoring speed."

When the lane change has been completed (T14), the own vehicle A stops the blinker. Then, automatic lane change is finished, and LKA is returned from the standby state to the active state. In addition, the directional speaker 13 reproduces, for example, contents such as "The lane change has been completed." as a notification voice for notifying the completion of the lane change. After the above process, the own vehicle A starts constant-speed travel along the change target lane by the functions of ACC and LKA.

Details of each image which is projected by the HUD device 14 in the above series of processes will be described with reference to FIGS. 13 to 16. The HUD device 14 is capable of projecting the suggestion image 150, the status image 151, and the LCA indicator 52c onto the projection area 14a in addition to the vehicle speed display 53, the notification ring 55, the operation guide 56, and each of the indicators 52a, 52b described above.

Figure 11:
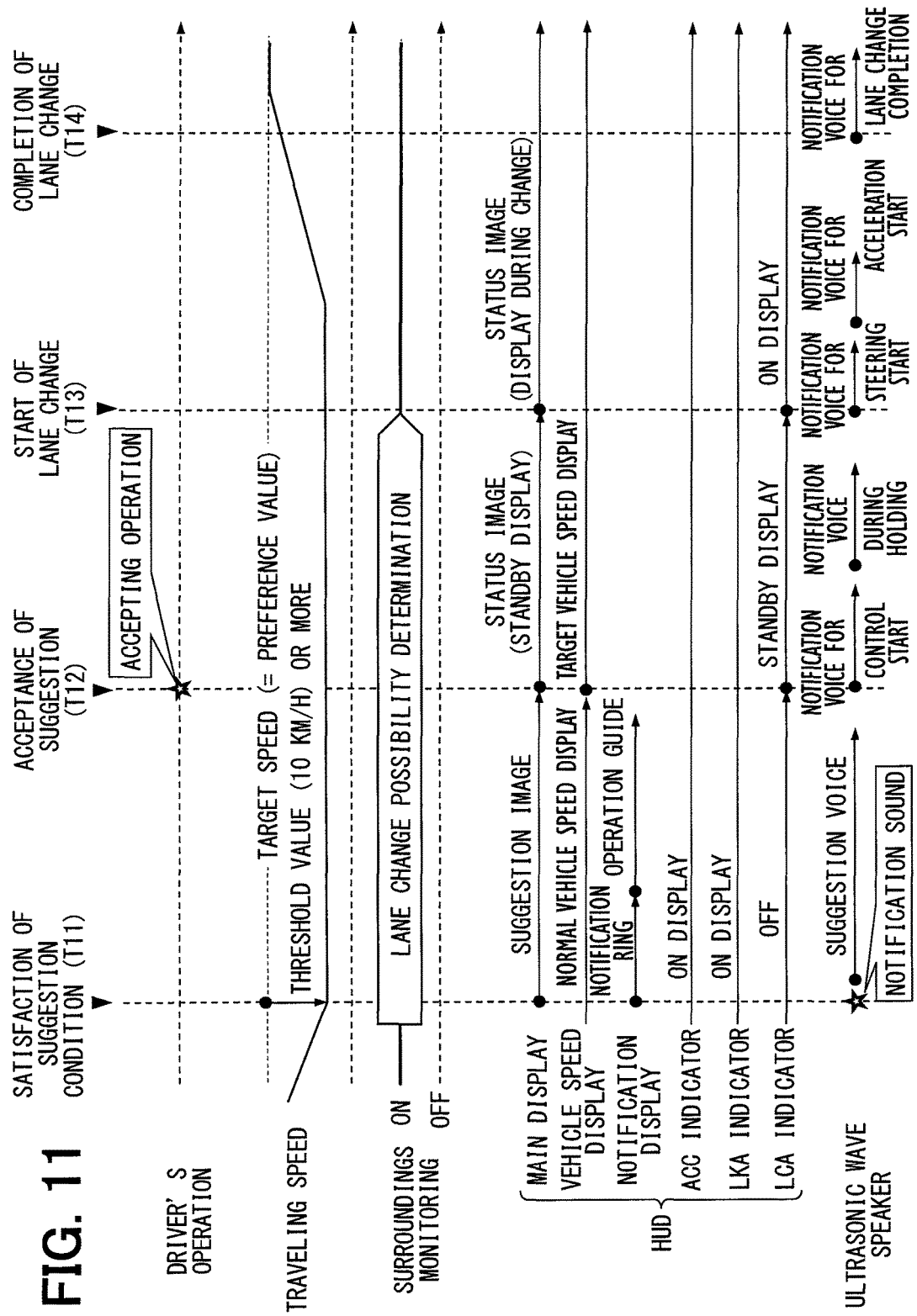
FIG. 11 is a time chart for describing a process relating to a suggestion of the startup of automatic lane change.
Figure 12:
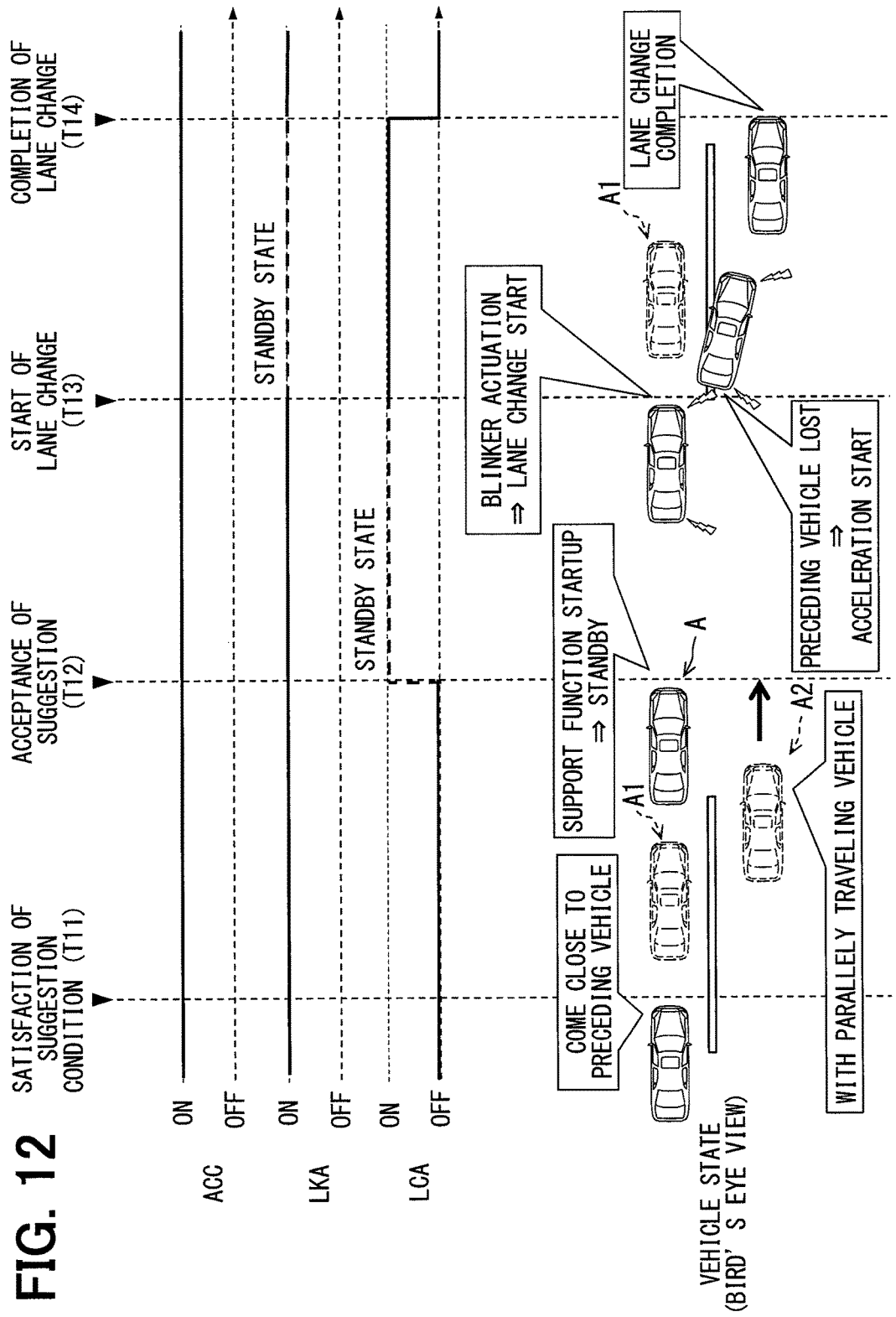
FIG. 12 is a time chart for describing the process relating to the suggestion of the startup of automatic lane change.
Figure 13:
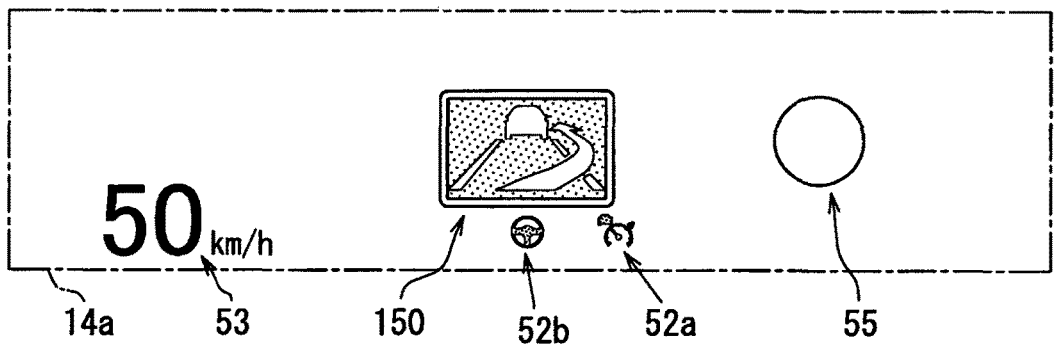
FIG. 13 is a diagram illustrating a suggestion image which performs the suggestion of the startup of automatic lane change.

FIG. 13 illustrates display of the projection area 14a when the startup suggestion condition is satisfied (refer to T11 of FIG. 11). At this time, the suggestion image 150, the ACC indicator 52a, the LKA indicator 52b, and the notification ring 55 are displayed in the projection area 14a in addition to the vehicle speed display 53 which indicates the current traveling speed of the own vehicle A (refer to FIG. 12).

Figure 14:
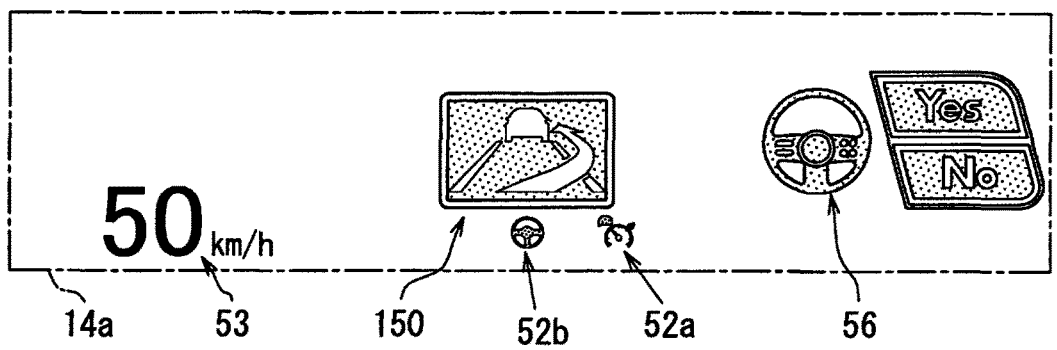
FIG. 14 is a diagram illustrating the suggestion image which performs the suggestion of the startup of automatic lane change.

The suggestion image 150 is an image corresponding to the suggestion image 50 (refer to FIG. 7) which is displayed at the time of suggesting the startup of ACC and displayed on the center of the projection area 14a. The suggestion image 150 is an image having a shape which includes a design obtained by reversing light and dark of the status image 151 (refer to FIG. 16) and a frame line which surrounds the outer periphery of the design. The suggestion image 150 can remind the driver of the active state of automatic lane change by the design similar to the status image 151 to urge the driver to start these functions. Also in the automatic lane change startup suggestion, the display of the notification ring 55 is finished with the start of reproduction of the suggestion voice after the finish of the notification sound. Then, display of the operation guide 56 illustrated in FIG. 14 is started.

FIG. 15 illustrates display of the projection area 14a when automatic lane change has been put on hold (refer to T12 of FIG. 11). Further, FIG. 16 illustrates display of the projection area 14a when a lane change is started by automatic lane change (refer to T13 of FIG. 11). As illustrated in FIGS. 15 and 16, the LCA indicator 52c and the status image 151 are displayed in the projection area 14a in these cases.

The LCA indicator 52c is arranged side by side with the indicators 52a, 52b below the status image 151. During holding of automatic lane change, the LCA indicator 52c includes a character of "READY" to notify the driver that the start of automatic lane change has been put on hold (standby state). The LCA indicator 52c periodically changes its brightness or periodically repeats flashing to represent the standby state. At the time of starting automatic lane change, the LCA indicator 52c stops the repetition of light and dark, and the display color thereof is changed, for example, from white to green. In addition, the character of "READY" is deleted from the LCA indictor 52c.

The status image 151 is an image corresponding to the status image 51 (refer to FIG. 9) which is displayed at the time of suggesting the startup of ACC and displayed on the center of the projection area 14a instead of the suggestion image 150 (refer to FIG. 13). The status image 151 is an image which represents a state of automatic lane change. The status image 151 includes an image portion 51d which represents a lane marking which partitions the change target lane in addition to the image portion 51a which imitates the preceding vehicle A1 (refer to FIG. 12) and the image portion 51c which indicates a lane marking of the current traveling lane. Further, the status image 151 includes an arrow-like image portion 51e which indicates a future moving direction of the own vehicle A (refer to FIG. 12). The arrow-like image portion 51e during holding of automatic lane change is displayed smaller than that during execution of automatic lane change.

Figure 17:
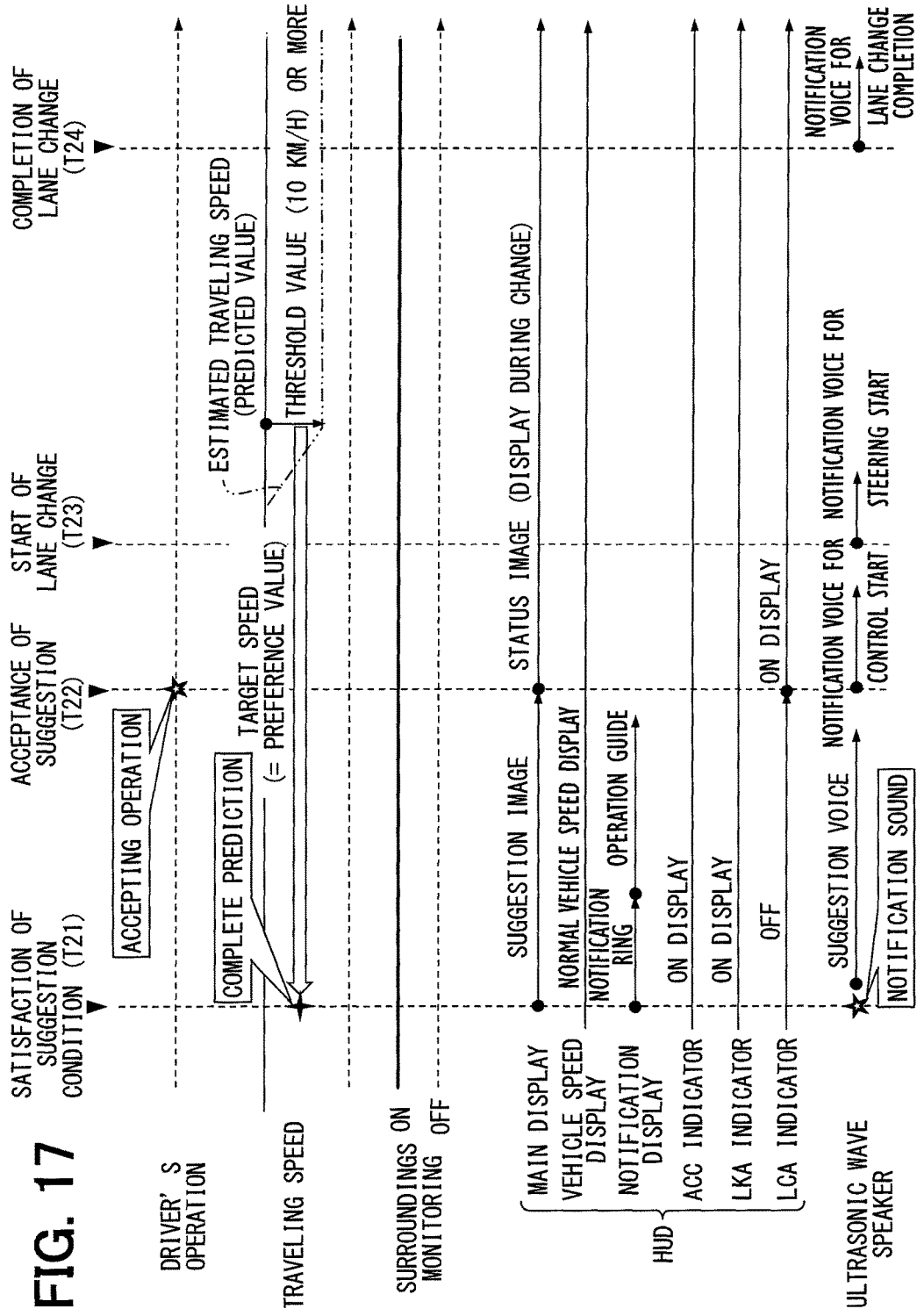
FIG. 17 is a time chart for describing a process relating to a startup suggestion based on prediction of a state value deviation.
Figure 18:
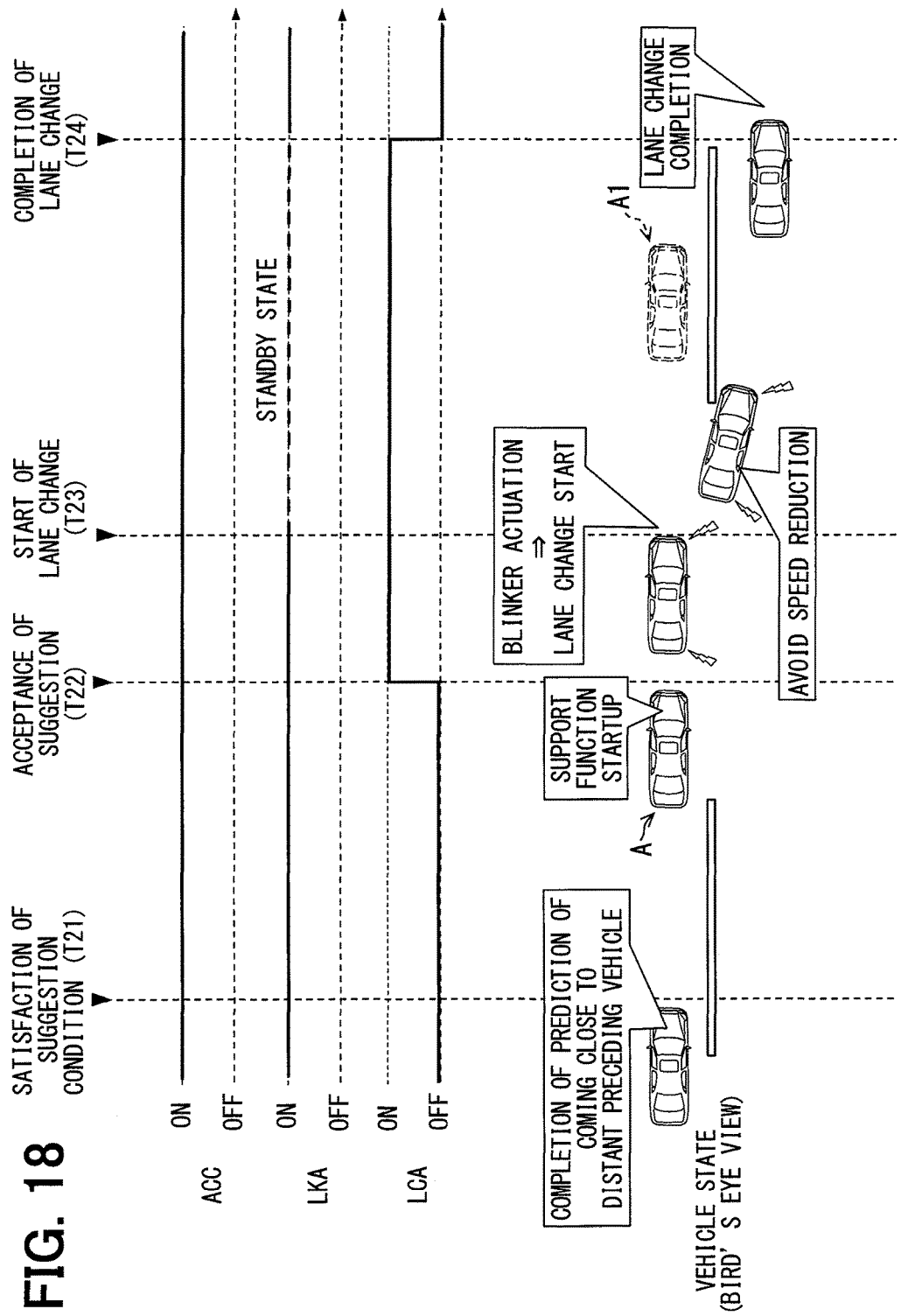
FIG. 18 is a time chart for describing the process relating to the startup suggestion based on prediction of a state value deviation.

In addition, also when a deviation of a future state value in the own vehicle A from the preference value is predicted, the display system 10 can suggest the startup of the driving support function. Hereinbelow, details of a process of further suggesting the startup of automatic lane change in a driving scene in which the own vehicle A is likely to come close to the distant preceding vehicle A1 will be described with reference to time charts illustrated in FIGS. 17 and 18, and further, to FIGS. 2 and 4.

The external recognition system 90 is capable of detecting a relative speed of the distant preceding vehicle A1 with respect to the own vehicle A. When the traveling speed of the distant preceding vehicle A1 is slower than the traveling speed of the own vehicle A, the own vehicle A is blocked in the traveling direction by the preceding vehicle A1 in the future. As a result, the traveling speed of the own vehicle A deviates from the preference value of the driver for the traveling speed by deceleration control to the own vehicle A by ACC (refer to an estimated traveling speed of FIG. 16).

The startup suggestion unit 36 estimates a traveling speed as a future state value in the own vehicle A on the basis of a traveling speed of the preceding vehicle A1 which is acquired as the another-vehicle state value and the current traveling speed of the own vehicle A. When the estimated traveling speed deviates by a predetermined threshold speed (e.g., 10 km/h) or more from the preference value, the startup suggestion unit 36 suggests the startup of automatic lane change on the basis of completion of the estimation (T21).

The suggestion image 150, the notification ring 55, and the operation guide 56 (refer to FIGS. 13 and 14) are virtually displayed by the HUD device 14 and the notification sound and the suggestion voice are reproduced by the directional speaker 13 by the startup suggestion by the startup suggestion unit 36. In the suggestion voice in this case, the reason why a lane change is made is further announced. For example, a suggestion voice such as "Will you move to the right adjacent lane to avoid the preceding vehicle? Press the switch of the steering to move." is reproduced.

When the driver inputs an accepting operation for accepting the startup suggestion (T22), automatic lane change as the driving support function is started up. When the parallelly traveling vehicle A2 (refer to FIG. 12) is not detected in the right adjacent lane by the external recognition system 90, the own vehicle A actuates the blinker in the moving direction (right side) and then starts moving to the right adjacent lane (T23). Accordingly, the own vehicle A can move to the right adjacent lane while maintaining the traveling speed before coming close to the preceding vehicle A1 and thereby decelerating.

The HUD device 14 starts display of the status image 151 (refer to FIG. 16) which notifies that the lane change is in execution at the timing of the startup suggestion. Further, the directional speaker 13 sequentially reproduces a notification voice which notifies the driver of the start of control by the driving support function and a notification voice which notifies the driver of the start of steering. The notification voice for the control start is, for example, a voice such as "Starting a lane change." The notification voice for the steering start is, for example, a voice such as "Starting moving to the right lane."

When the lane change has been completed (T24), the own vehicle A stops the blinker. Further, LKA is returned from the standby state to the active state with the finish of automatic lane change. In addition, the directional speaker 13 reproduces, for example, a voice such as "The lane change has been completed." as a notification voice for notifying the completion of the lane change. When the reproduction of the notification voice has been completed, the display of the status image 151 and the LCA indicator 52c (refer to FIG. 16) is also finished. After the above process, the own vehicle A starts constant-speed travel along the change target lane by the functions of ACC and LKA.

Figure 19:
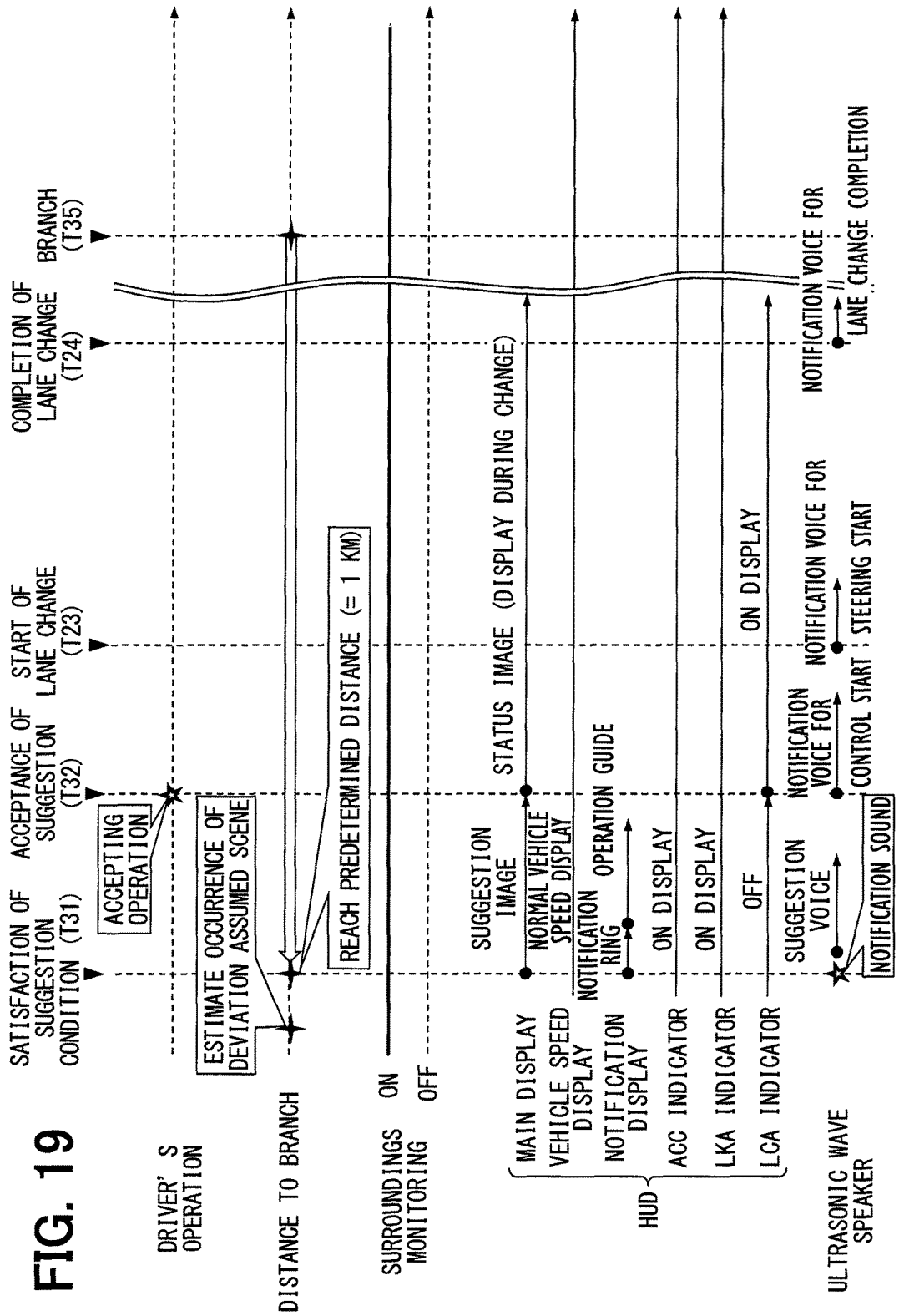
FIG. 19 is a time chart for describing a process of a startup suggestion based on estimation of the occurrence of a deviation assumed scene relating to route guide.
Figure 20:
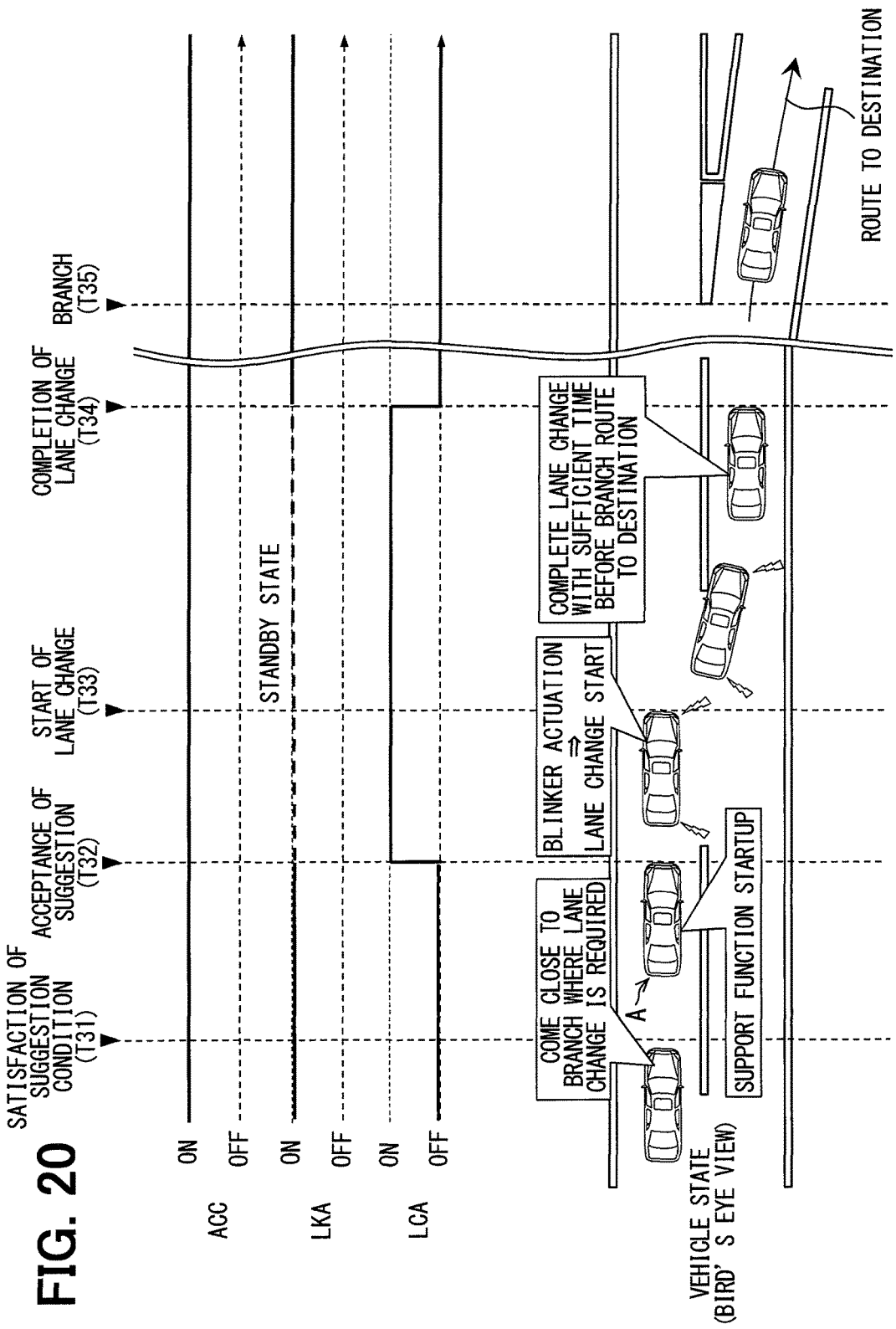
FIG. 20 is a time chart for describing the process relating to the startup suggestion based on estimation of the occurrence of a deviation assumed scene relating to route guide.

Further, also when the occurrence of a deviation assumed scene is estimated by the scene estimation unit 39, it is predicted that the future state value deviates from the preference value. There is a driving scene, as an example of such a deviation assumed scene, in which a lane change is made to travel along a route to a destination set by the navigation system 96. In this deviation assumed scene, it is necessary to quickly make a lane change near a branch point. Thus, the traveling speed of the own vehicle A is likely to deviate from the preference value. Hereinbelow, details of a process of suggesting the startup of automatic lane change to the driver to avoid the occurrence of a deviation assumed scene relating to such route guide will be described with reference to time charts illustrated in FIGS. 19 and 20, and further, to FIGS. 2 and 4.

When the scene estimation unit 39 estimates the occurrence of a condition where a lane change is made immediately before the branch point, the startup suggestion unit 36 suggests the startup of automatic lane change on the basis of the estimation of the occurrence of the deviation assumed scene before the branch point by a predetermined distance (e.g., 1 km) (T31). In accordance with the startup suggestion, the suggestion image 150, the notification ring 55, and the operation guide 56 (refer to FIGS. 13 and 14) are virtually displayed by the HUD device 14, and the notification sound and the suggestion voice are reproduced by the directional speaker 13. Also in the suggestion voice in this case, the reason why the lane change is made is announced. For example, the suggestion voice such as "Will you move to the right adjacent lane to head for XXX (destination)? Press the switch of the steering to move." is reproduced.

When the driver inputs an accepting operation for accepting the startup suggestion (T32), automatic lane change is started up. When the parallelly traveling vehicle A2 (refer to FIG. 12) is not detected in the right adjacent lane by the external recognition system 90, the own vehicle A actuates the blinker in the moving direction (right side) and then starts moving to the right adjacent lane (T33). In accordance with the startup of the driving support function described above, the HUD device 14 starts display of the status image 151 (refer to FIG. 16) which notifies that the lane change is in execution. Further, the directional speaker 13 sequentially reproduces a notification voice which notifies the driver of the start of control such as "Starting the lane change." and a notification voice which notifies the start of steering such as "Starting moving to the right lane."

When the lane change has been completed (T34), the own vehicle A stops the blinker. In addition, the directional speaker 13 reproduces a notification voice which notifies the completion of the lane change. When the reproduction of the notification voice has been completed, the display of the status image 151 (refer to FIG. 16) is also finished. Accordingly, the own vehicle A can complete the lane change with sufficient time while maintaining the traveling speed before approaching the branch point where a lane change is required. Thus, the own vehicle A can smoothly pass through the branch point along a correct route which is set by the navigation system 96 (T35).

Figure 21:
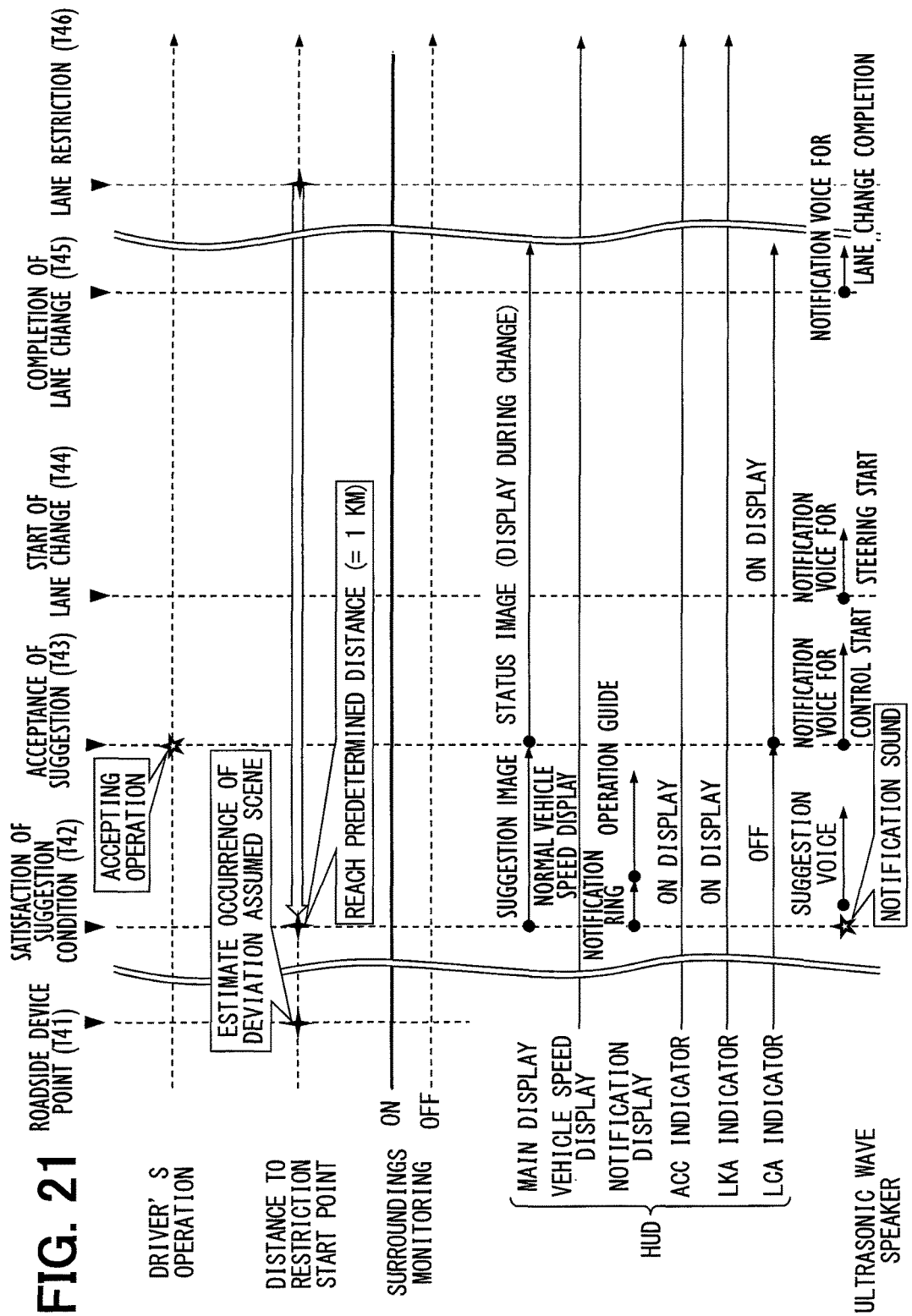
FIG. 21 is a time chart for describing a process relating to a startup suggestion based on estimation of the occurrence of a deviation assumed scene relating to a lane restriction.
Figure 22:
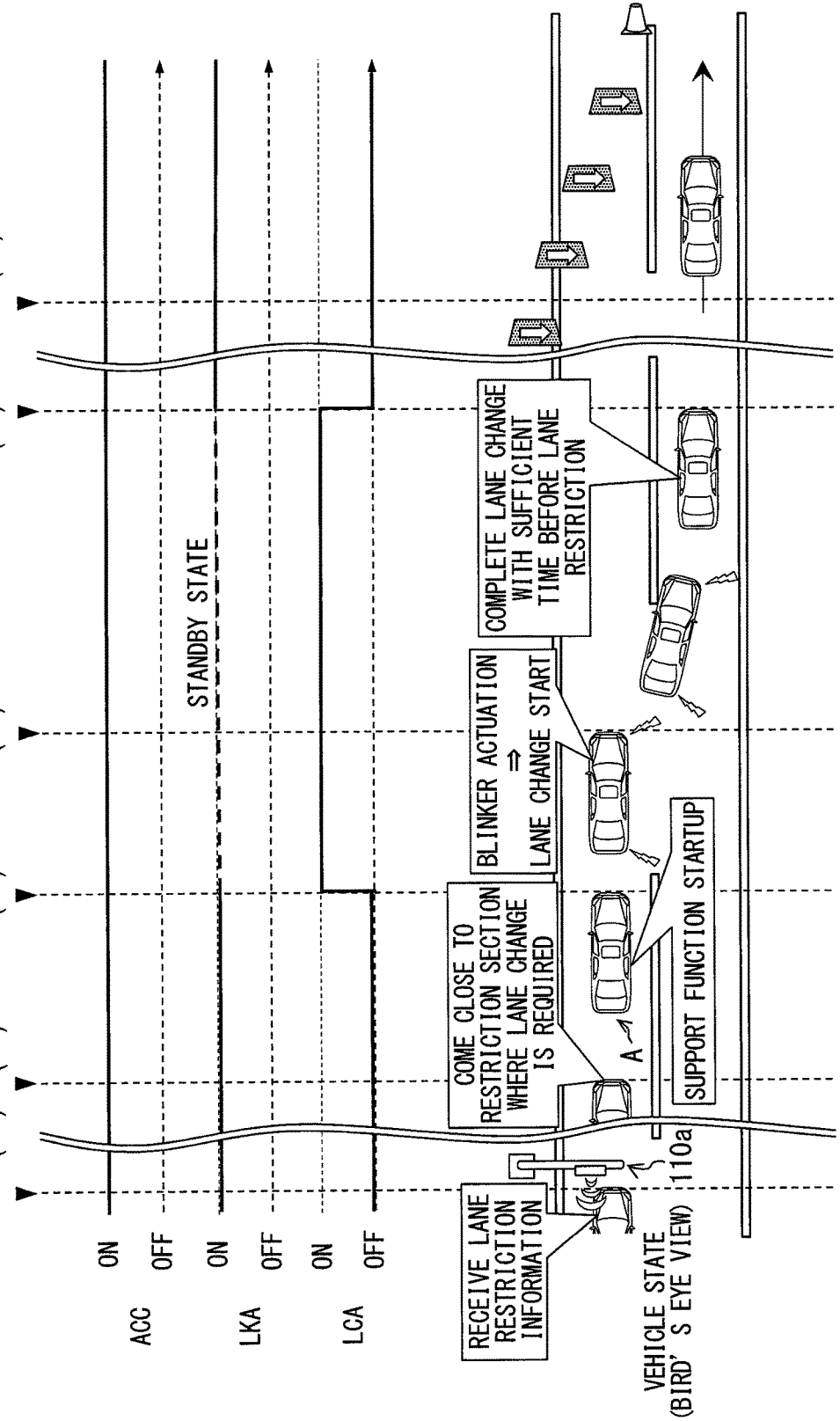
FIG. 22 is a time chart for describing the process relating to the startup suggestion based on estimation of the occurrence of a deviation assumed scene relating to a lane restriction.

Next, a driving scene in which a lane change to an adjacent lane is made when the own vehicle A cannot travel in the current traveling lane due to a lane restriction will be described as another example of the deviation assumed scene. Also in this deviation assumed scene, it is necessary to quickly make the lane change before a starting point of the lane restriction. Thus, the traveling speed of the own vehicle A is likely to deviate from the preference value. Hereinbelow, details of a process of suggesting the startup of automatic lane change to the driver to avoid the occurrence of a deviation assumed scene relating to such lane restriction will be described with reference to time charts illustrated in FIGS. 21 and 22, and further, to FIGS. 2 and 4.

Road information ahead such as a lane restriction is wirelessly transmitted by the roadside device 110a. Thus, the wireless communication device 97 receives the road information relating to the lane restriction at the timing when the own vehicle A passes through an installation point of the roadside device 110a (T41). The scene estimation unit 39 can estimate the occurrence of a deviation assumed scene in which a lane change is made immediately before the starting point of the lane restriction on the basis of the acquired road information.

When the scene estimation unit 39 estimates the occurrence of the deviation assumed scene relating to the lane restriction, the startup suggestion unit 36 suggests the startup of automatic lane change before the starting point of the restriction by a predetermined distance (e.g., 1 km) (T42). In accordance with the startup suggestion, the suggestion image 150 (refer to FIGS. 13 and 14) is virtually displayed by the HUD device 14, and the notification sound and the suggestion voice are reproduced by the directional speaker 13. Also in the suggestion voice in this case, the reason why the lane change is made is announced. For example, a suggestion voice such as "Will you move to the right adjacent lane due to the lane restriction ahead? Press the switch of the steering to move." is reproduced.

When the driver inputs an accepting operation for accepting the startup suggestion (T43), similarly to the above case of the lane change relating to route guide, the own vehicle A actuates the blinker in the moving direction (right side) and then starts moving to the right adjacent lane (T44). In addition, the HUD device 14 and the directional speaker 13 sequentially notify the driver of the start timing of control and the start timing of steering.

When the lane change has been completed (T45), the blinker is stopped, and the directional speaker 13 reproduces a notification voice which notifies the completion of the lane change. In addition, when the reproduction of the notification voice has been completed, the display of the status image 151 and the LCA indicator 52c (refer to FIG. 16) is also finished. Accordingly, the own vehicle A can complete the lane change with sufficient time while maintaining the traveling speed before approaching the starting point of the lane restriction where a lane change is required. Thus, the own vehicle A can smoothly pass through the starting point of the lane restriction (T46).

Figure 23:
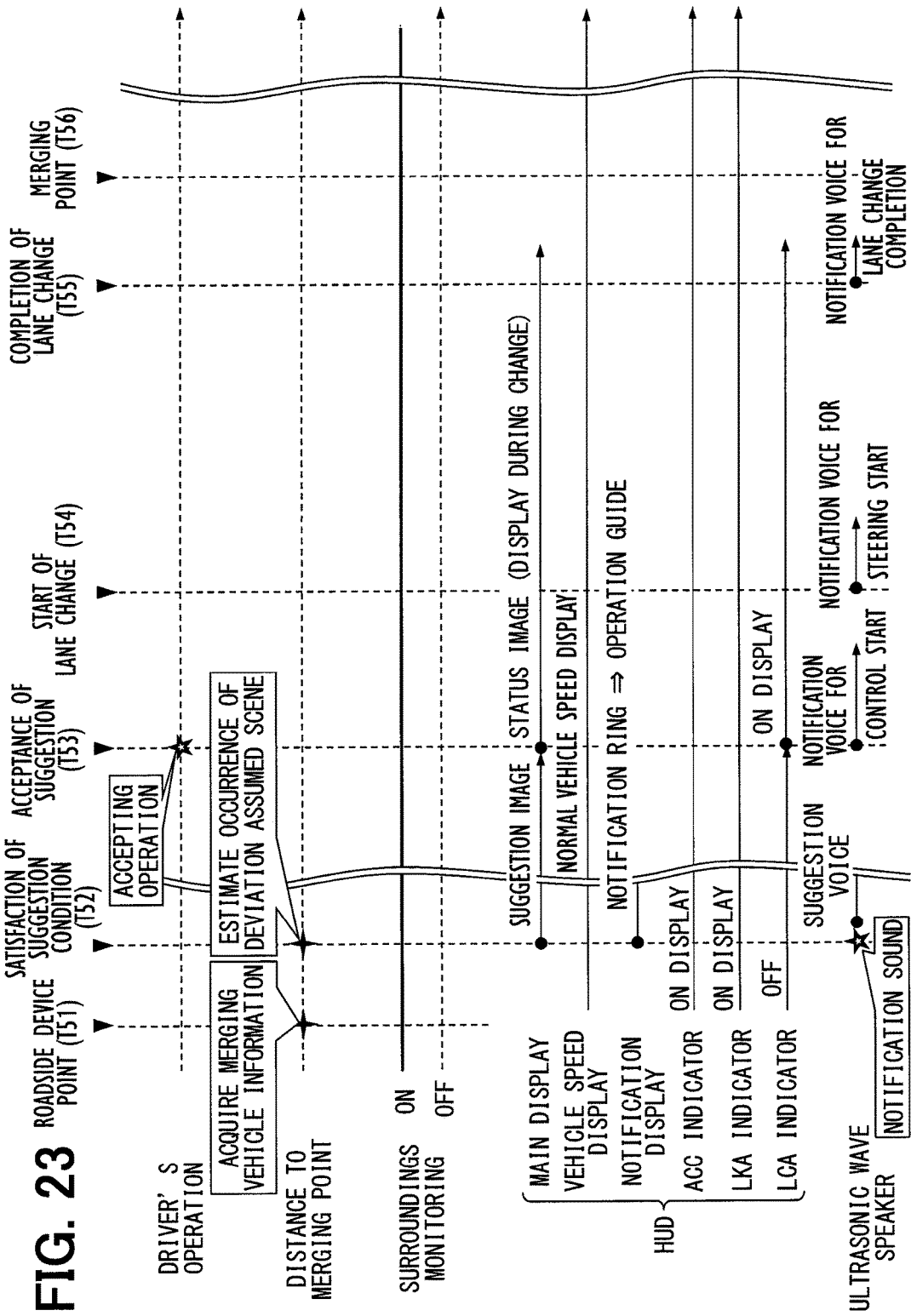
FIG. 23 is a time chart for describing a process relating to a startup suggestion based on estimation of the occurrence of a deviation assumed scene relating to a merging point.

Next, a driving scene in which a lane change to an adjacent lane is made to avoid another vehicle A3 which merges into the current traveling lane (hereinbelow, a merging vehicle) will be described as another example of the deviation assumed scene. In this deviation assumed scene, it is necessary to immediately avoid the visually recognized merging vehicle A3. Thus, the traveling speed of the own vehicle A is likely to deviate from the preference value, and the driver is likely to feel stress. Hereinbelow, details of a process of suggesting the startup of automatic lane change to the driver to avoid the occurrence of such a deviation assumed scene relating to a merging point will be described with reference to time charts illustrated in FIGS. 23 and 24, and further, to FIGS. 2 and 4.

In a main through lane ML of an expressway, the roadside device 110a which is capable of wirelessly communicating with the wireless communication device 97 is installed before a merging point where a ramp way RW merges by a predetermined distance (e.g., approximately several hundred meters to 1 km). The ramp way RW is a road which connects an interchange, a service area or a parking area, or another expressway to the main through lane ML. In the ramp way RW, a detection roadside device 110b which detects passage of the merging vehicle A3 is installed before the merging point by a predetermined distance (e.g., approximately several hundred meters). The roadside device 110a acquires a time when the merging vehicle A3 passes and a traveling speed at the passage time from the detection roadside device 110b and wirelessly transmits road information including the passage time and the traveling speed to a vehicle which passes on the lower side.

The wireless communication device 97 acquires information relating to the merging vehicle A3 at a timing when the own vehicle A passes through the installation point of the roadside device 110a (T51). The scene estimation unit 39 determines the presence or absence of the merging vehicle A3 which merges into the main through lane ML at a timing when the own vehicle A passes through the merging point on the basis of the acquired road information. When the merging vehicle A3 which may travel side by side with the own vehicle A has been detected, the scene estimation unit 39 estimates the occurrence of a deviation assumed scene in which the own vehicle A moves to the right adjacent lane to avoid the merging vehicle A3. In accordance with the estimation, the startup suggestion unit 36 suggests the startup of automatic lane change before the merging point by a predetermined distance (e.g., several hundred meters) (T52).

In accordance with the above startup suggestion, the suggestion image 150 (refer to FIGS. 13 and 14) is virtually displayed by the HUD device 14, and the notification sound and the suggestion voice are reproduced by the directional speaker 13. In the suggestion voice in this case, for example, a suggestion voice such as "There is a merging point ahead. Will you move to the right adjacent lane to avoid the merging vehicle A3? Press the switch of the steering to move." is reproduced.

When the driver inputs an accepting operation for accepting the startup suggestion (T53), similarly to the above cases of the lane changes relating to route guide and lane restriction, the own vehicle A actuates the blinker in the moving direction (right side) and then starts moving to the right adjacent lane (T54). The HUD device 14 and the directional speaker 13 perform notification at the start timing of control and the start timing of steering.

When the lane change has been completed (T55), the blinker is stopped, and the directional speaker 13 reproduces a notification voice which notifies the completion of the lane change. In addition, when the reproduction of the notification voice has been completed, the display of the status image 151 and the LCA indicator 52c is also finished. Accordingly, the own vehicle A can complete the lane change for avoiding the merging vehicle A3 with sufficient time while maintaining the traveling speed before the merging vehicle A3 becomes visually recognizable by the driver. As a result, the own vehicle A can smoothly pass through the merging point (T56).

Details of processes performed by the control circuits 20a, 70a of the HCU 100 and the vehicle control ECU 70 to implement the startup suggestion method described above will be described with reference to FIGS. 25 to 31, and further, to FIGS. 1 and 2. Each of processes illustrated in flowcharts of FIGS. 25 and 26 is repeatedly performed by the control circuit 20a of the HCU 100 in response to switching of a selector lever 16 to the D range so as to bring the own vehicle A into a travelable state.

Figure 25:
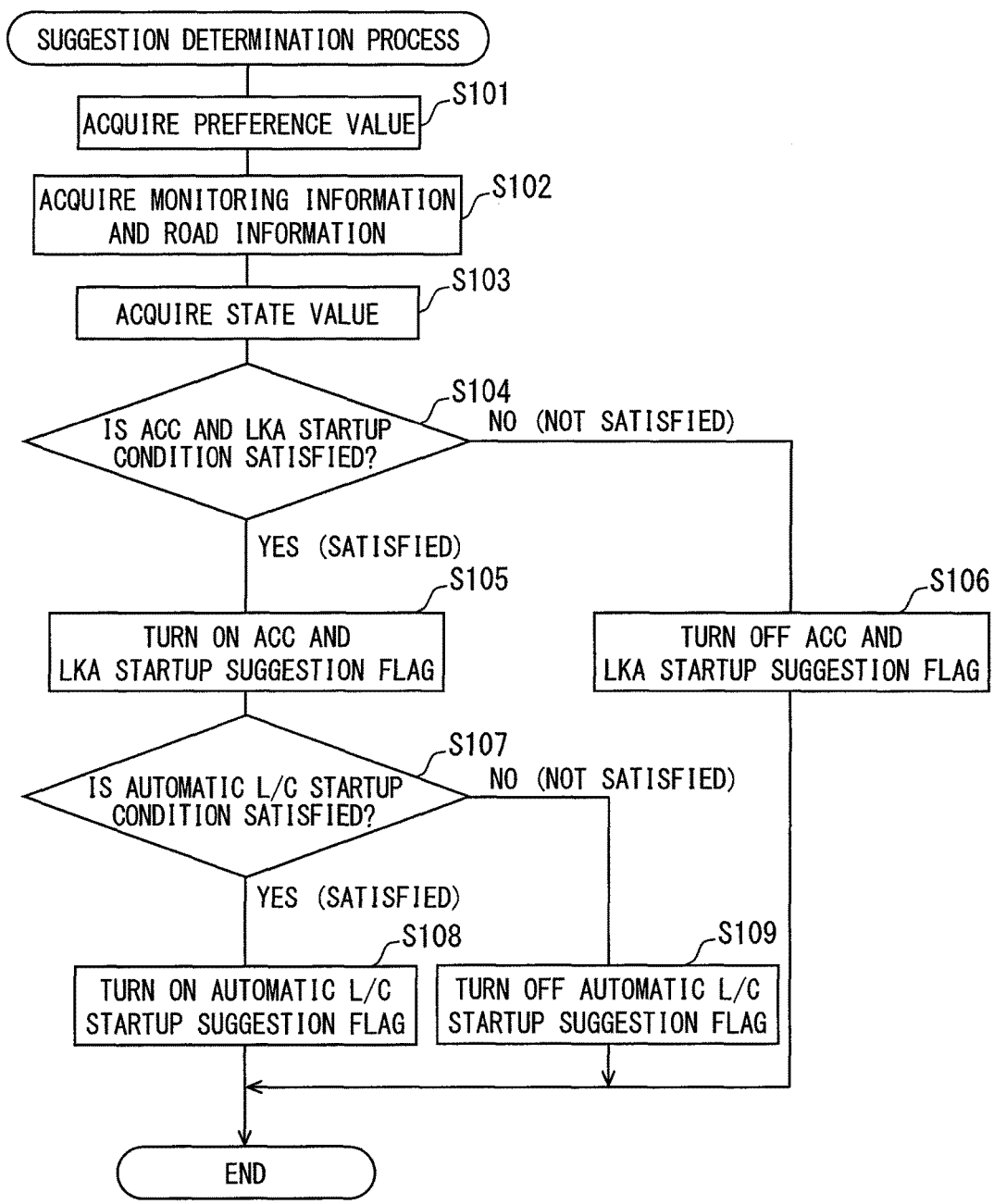
FIG. 25 is a flowchart illustrating a suggestion determination process which is performed by the control circuit of the HCU.
Figure 26:
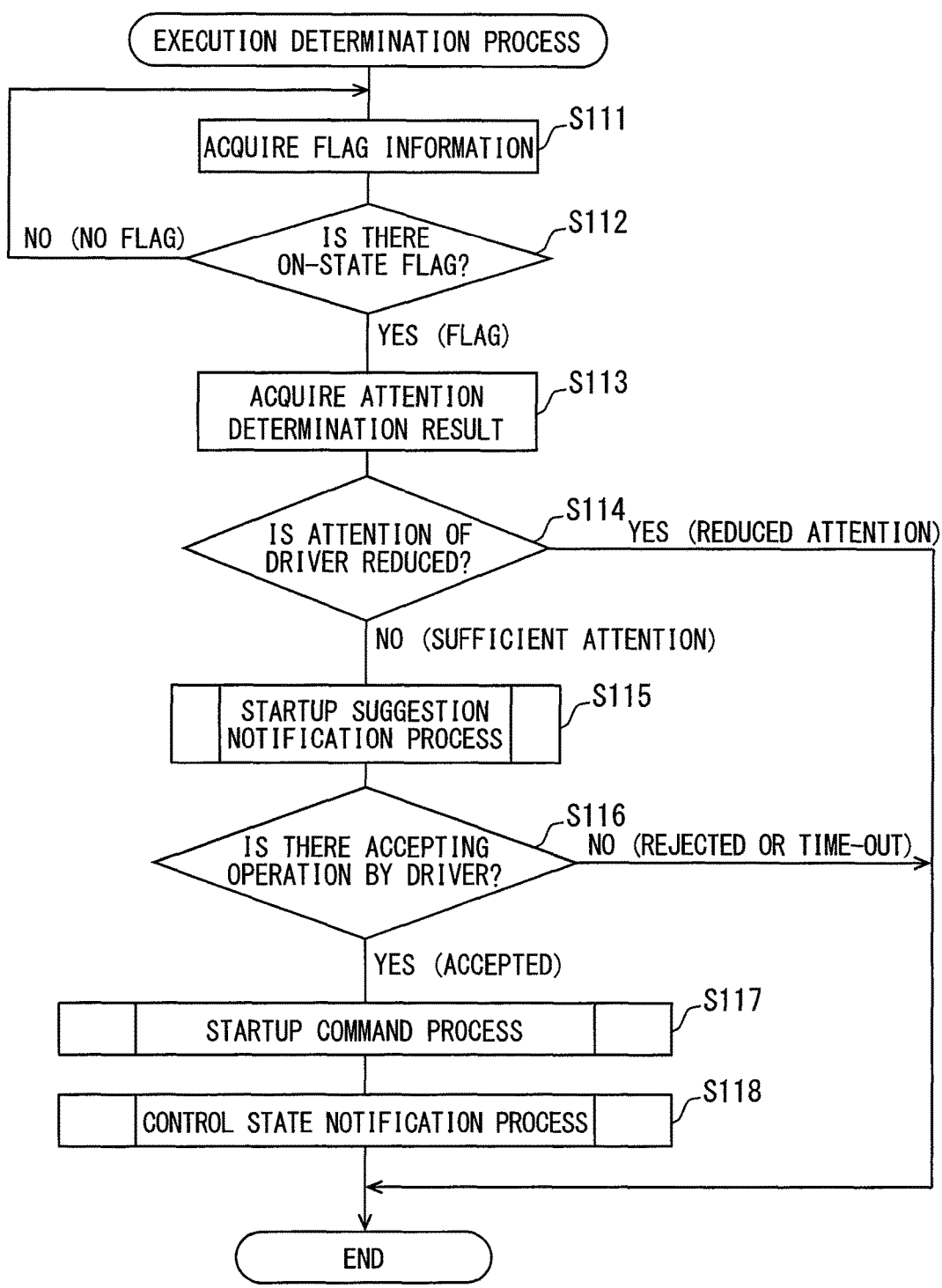
FIG. 26 is a flowchart illustrating an execution determination process.

A preference value which reflects a traveling state preferred by the driver is acquired in S101 of a suggestion determination process illustrated in FIG. 25, and the process proceeds to S102. Monitoring information obtained by monitoring the surroundings of the own vehicle A is acquired from the surroundings monitoring ECU 91 in S102, and the process proceeds to S103. When the wireless communication device 97 outputs road information to the communication bus 99, the road information is acquired in S102. Further, also when the navigation system 96 outputs route information to the communication bus 99, the route information is acquired in S102. A state value indicating the current traveling state of the own vehicle A is acquired in S103, and the process proceeds to S104.

In S104, it is determined whether the condition for starting up ACC and LKA is satisfied on the basis of the values and the pieces of information acquired in S101 to S103. When it is determined that the startup condition is satisfied in S104, the process proceeds to S105. A flag of suggestion of the startup of ACC and LKA is turned ON in S105 so that the startup of these driving support functions is suggested to the driver by each process described below, and the process proceeds to S107. On the other hand, when it is determined that the startup condition is not satisfied in S104, the process proceeds to S106. In S106, the flag of the ACC and LKA startup suggestion is turned OFF, and a series of processes is finished.

In S107, it is determined whether the condition for starting up automatic lane change is satisfied on the basis of the values and the pieces of information acquired in S101 to S103. When it is determined that the startup condition is satisfied in S107, the process proceeds to S108. In S108, a flag of suggestion of the startup of automatic lane change is turned ON, and a series of processes is finished. On the other hand, when it is determined that the startup condition is not satisfied in S107, the process proceeds to S109. In S109, the flag of the automatic lane change startup suggestion is turned OFF, and a series of processes is finished.

A plurality of startup conditions are previously set as the startup conditions used in S104 and S107 described above. One of the startup conditions is set in such a manner that an affirmative determination is made when the current traveling speed deviates from the preference value. In order to implement such a determination, at least the presence or absence of the preceding vehicle A1 based on monitoring information and the preference value and the state value for the traveling speed are acquired in S101 to S103.

Further, another one of the startup conditions is set in such a manner that an affirmative determination is made when a prediction of a deviation of the future traveling speed from the preference value is made. Further, another one of the startup conditions is set in such a manner that an affirmative determination is made when the occurrence of a deviation assumed scene is estimated. In order to implement these determinations, the relative speed of the preceding vehicle A1 based on monitoring information, route information, and various pieces of road information are acquired in S101 to S103.

Flag information of the startup suggestion set by the suggestion determination process is acquired in S111 of an execution determination process illustrated in FIG. 26, and the process proceeds to S112. In S112, it is determined whether there is a flag in an ON state on the basis of the flag information acquired in S111. When it is determined that there is a flag in an ON state in S112, the process proceeds to S113. On the other hand, when it is determined that there is no flag in an ON state, S111 and S112 are repeatedly performed until a flag is turned ON.

A result of determination for the attention of the driver by the attention determination unit 35 (refer to FIG. 4) is acquired in S113, and the process proceeds to S114. In S114, it is determined whether there is a reduction in the attention of the driver on the basis of the determination result acquired in S113. When it is determined that the attention of the driver is reduced in S114, a series of processes is finished. Accordingly, when the attention of the driver is reduced, the driving support function startup suggestion is stopped. On the other hand, when it is determined that the driver has sufficient attention in S114, the process proceeds to S115. A startup suggestion notification process (refer to FIG. 27) is performed in S115, and the process proceeds to S116. A startup suggestion to the driver is performed by the startup suggestion notification process.

In S116, it is determined whether the driver has input an accepting operation. When it is determined that the driver has input a rejecting operation or a predetermined time has passed with no accepting operation to cause time-out in S116, a series of processes is finished. On the other hand, when it is determined that the accepting operation has been input in S116, the process proceeds to S117.

A startup command process (refer to FIGS. 28 and 29) is performed in S117, and the process proceeds to S118. A control state notification process (refer to FIGS. 29 and 31) is performed in S118, and a series of processes is finished. In S117 and S118, the startup command process and the control state notification process corresponding to the flag information acquired in S111 are performed. When the flag information relating to ACC and LKA has been acquired in S111, the startup command process for starting up ACC and LKA in the vehicle control ECU 70 (refer to FIG. 28) is performed in S117. Then, in S118, the control state notification process for notifying the driver of a control state of ACC and LKA (refer to FIG. 29) is performed. On the other hand, when the flag information relating to automatic lane change has been acquired in S111, the startup command process for starting up automatic lane change in the vehicle control ECU 70 (refer to FIG. 22) is performed in S117. Then, in S118, the control state notification process for notifying the driver of a control state of automatic lane change (refer to FIG. 31) is performed.

Next, details of the startup suggestion notification process of S115, the startup command process of S117, and the control state notification process of S118 which are sub-processes of the execution determination process will be sequentially described.

Figure 27:
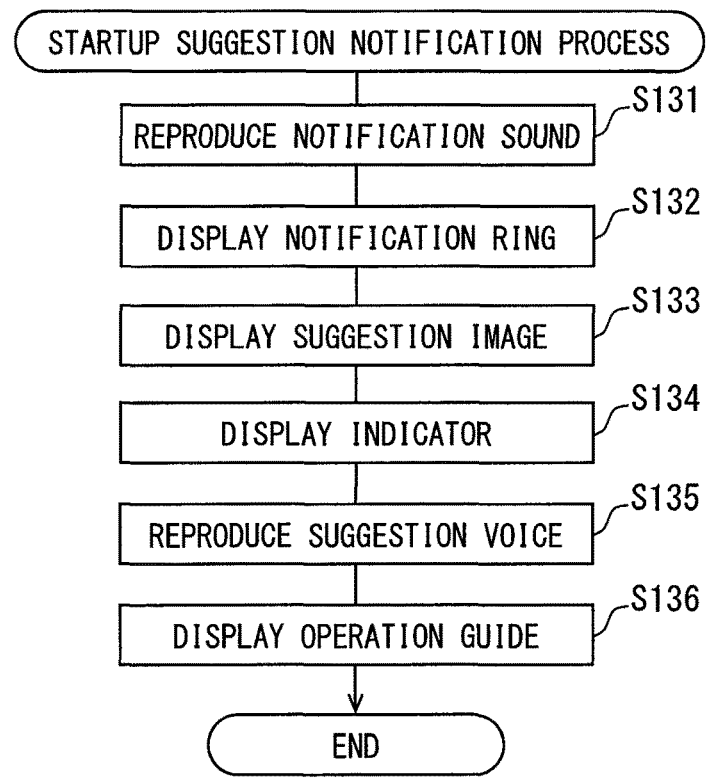
FIG. 27 is a flowchart illustrating a startup suggestion notification process.

The startup suggestion notification process illustrated in FIG. 27 is executed by the control circuit 20a of the HCU 100. A notification sound is reproduced by the directional speaker 13 in S131, and the process proceeds to S132. The notification ring 55 (refer to FIGS. 7 and 13) is displayed by the HUD device 14 in S132, and the process proceeds to S133. The suggestion image 50 (refer to FIGS. 7 and 13) is displayed by the HUD device 14 in S133, and the process proceeds to S134. Each of the indicators 52a, 52b (refer to FIGS. 7 and 13) is appropriately displayed by the HUD device 14 in S134, and the process proceeds to S135. A suggestion voice is reproduced by the directional speaker 13 in S135, and the process proceeds to S136. The operation guide 56 (refer to FIGS. 8 and 14) is displayed by the HUD device 14 in S136, and a series of processes is finished. The above startup suggestion notification process is performed both when the ACC and LKA startup suggestion is performed and when the automatic lane change startup suggestion is performed.

Figure 28:
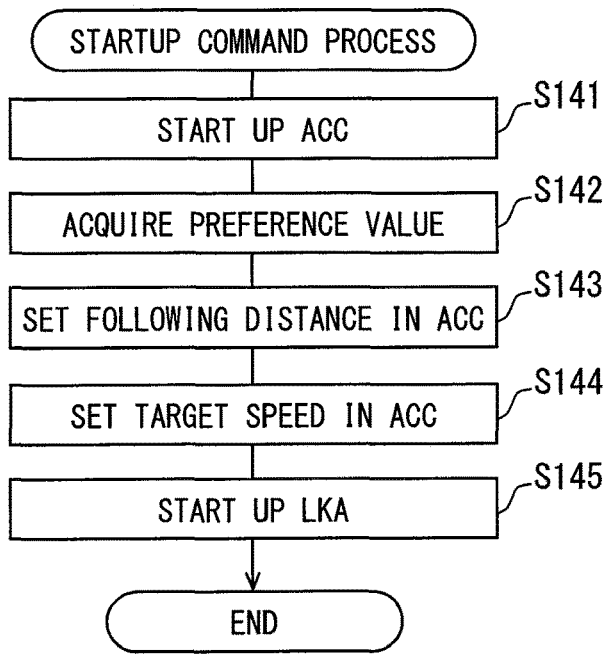
FIG. 28 is a flowchart illustrating a startup command process.

The startup command process illustrated in FIG. 28 is executed by the control circuit 70a of the vehicle control ECU 70 on the basis of command information from the HCU 100 when an operation for accepting the ACC and LKA startup suggestion is input. ACC is started up by the ACC functional unit 81 (refer to FIG. 3) in S141, and the process proceeds to S142. Preference values for the following distance and the traveling speed are acquired in S142, and the process proceeds to S143. A target distance when ACC controls the following distance is set from "long", "middle", and "short" in S143 on the basis of the preference value for the following distance acquired in S142, and the process proceeds to S144. The preference value for the traveling speed acquired in S142 is set as a target speed when ACC controls the traveling speed in S144, and the process proceeds to S145. LKA is started up by the LKA functional unit 82 (refer to FIG. 3) in S145, and a series of processes is finished.

Figure 29:
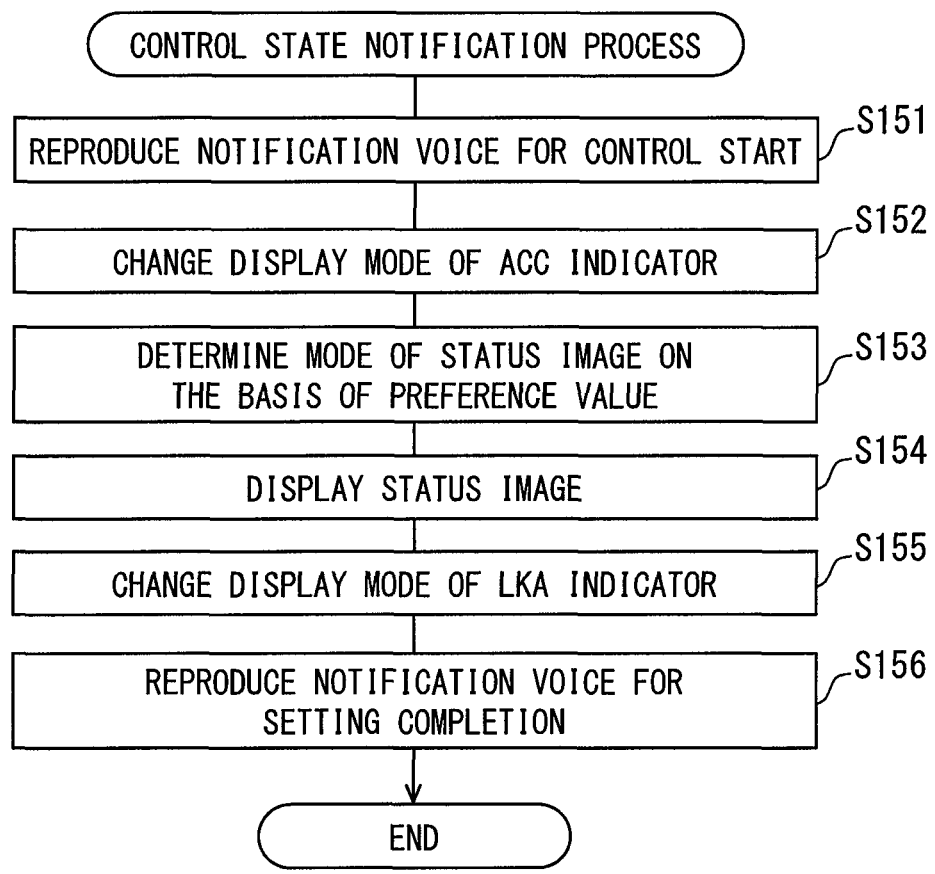
FIG. 29 is a flowchart illustrating a control state notification process.

The control state notification process illustrated in FIG. 29 is executed by the control circuit 20a of HCU 100 when an operation for accepting the ACC and LKA startup suggestion is input. A notification voice for control start is reproduced by the directional speaker 13 in S151, and the process proceeds to S152. A display mode of the ACC indicator 52a (refer to FIG. 9) which is displayed by the HUD device 14 is changed from a standby state to an active state in S152, and the process proceeds to S153. A display mode of the image portion 51b (refer to FIG. 9) of the status image 51 is determined on the basis of the preference value in S153, and the process proceeds to S154. The status image 51 is displayed by the HUD device 14 in S154, and the process proceeds to S155. A display mode of the LKA indicator 52b (refer to FIG. 9) which is displayed by the HUD device 14 is changed from a standby state to an active state in S155, and the process proceeds to S156. A notification voice for ACC and LKA setting completion is reproduced by the directional speaker 13 in S156, and a series of processes is finished.

Figure 30:
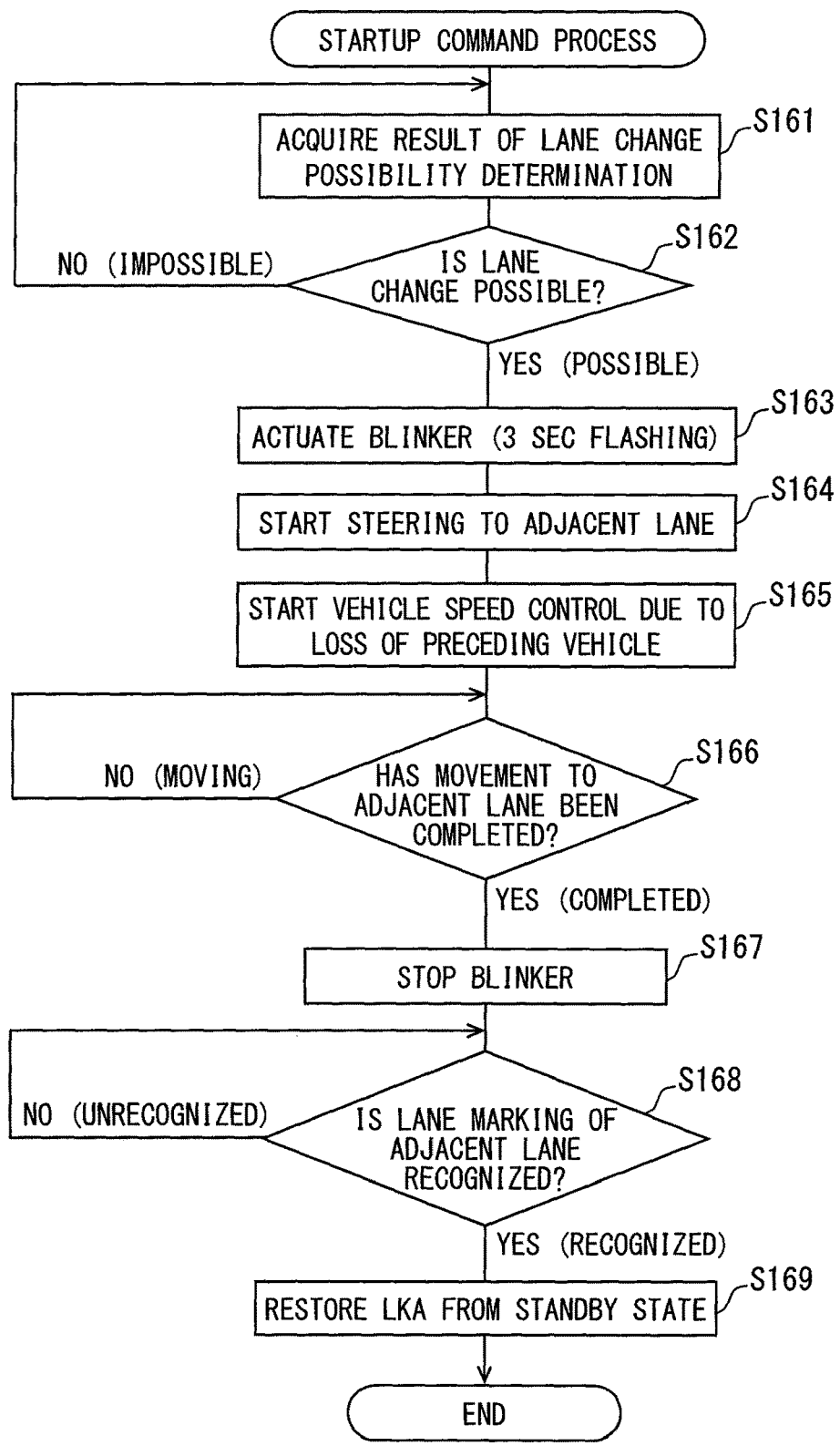
FIG. 30 is a flowchart illustrating a startup command process.

The startup command process illustrated in FIG. 30 is executed by the control circuit 70a of the vehicle control ECU 70 on the basis of command information from the HCU 100 when an operation for accepting the automatic lane change startup suggestion is input. A result of the determination of the possibility of a lane change is acquired from the surroundings monitoring ECU 91 in S161, and the process proceeds to S162. Standby is made in S162 until a determination result indicating that the lane change can be performed is acquired in S161, and the process proceeds to S163 on the basis of the determination result indicating that the lane change can be performed.

A blinker in the moving direction is operated in S163, and the process proceeds to S164. An operating time of the blinker can be limited to a predetermined time (e.g., approximately 3 seconds). Steering toward an adjacent lane is started in S164, and the process proceeds to S165. Vehicle speed control by ACC is started in S165, in response to a loss of the preceding vehicle A1 (refer to FIG. 12), and the process proceeds to S166.

In S166, it is determined whether the movement to the adjacent lane has been completed. In S166, the completion of the movement is determined on the basis of all four wheels of the own vehicle A put inside the change target lane. The determination is repeatedly performed until the completion of the movement to make standby in S166, and the process proceeds to S167 on the basis of the determination of movement completion. The blinker is stopped when the blinker is in operation in S167, and the process proceeds to S168.

In S168, it is determined whether a lane marking of the change target lane has been recognized by the surroundings monitoring ECU 91. The determination is repeatedly performed until the lane marking is recognized to make standby in S168, and the process proceeds to S169 on the basis of the start of the recognition. LKA which is kept in a standby state with the startup of automatic lane change is restored to an active state in S169, and a series of processes is finished.

Figure 31:
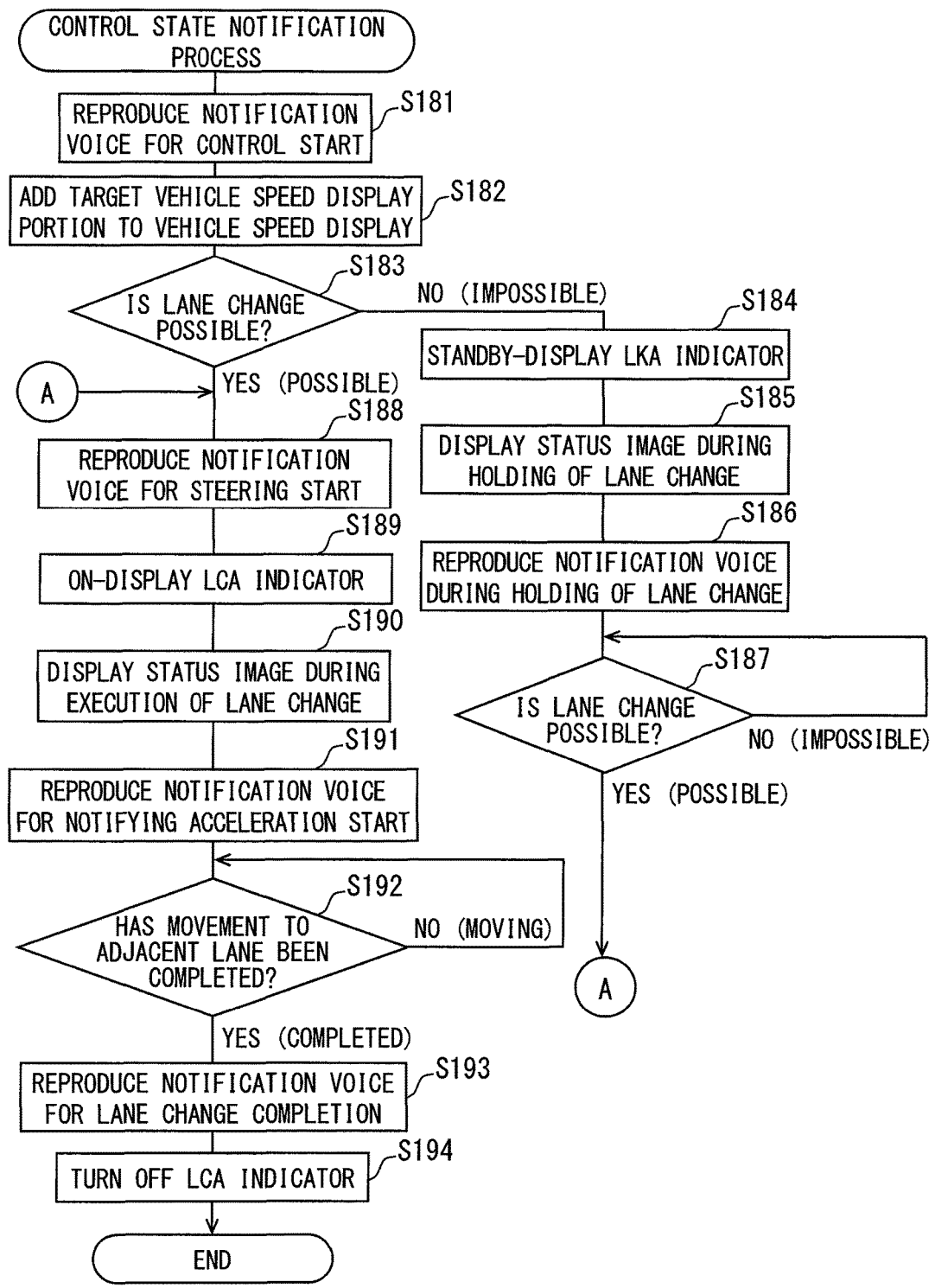
FIG. 31 is a flowchart illustrating the control state notification process.

The control state notification process illustrated in FIG. 31 is executed by the control circuit 20a of the HCU 100 when an operation for accepting the automatic lane change startup suggestion is input. A notification voice for control start is reproduced by the directional speaker 13 in S181, and the process proceeds to S182. The target speed display portion 54 (refer to FIG. 14) is added to the vehicle speed display 53 which is displayed by the HUD device 14 in S182, and the process proceeds to S183.

In S183, the process is branched on the basis of a result of the determination of the possibility of a lane change acquired by the startup command process. When a determination result indicating that the lane change can be performed is acquired, the process proceeds to S188. On the other hand, when a determination result indicating that the lane change cannot be performed is acquired, the process proceeds to S184.

The LCA indicator 52c (refer to FIG. 15) is displayed in a standby mode by the HUD device 14 in S184, and the process proceeds to S185. The status image 151 (refer to FIG. 15) for the case where the lane change is put on hold is displayed in S185, and the process proceeds to S186. A notification voice for holding of the lane change is reproduced by the directional speaker 13 in step S186, and the process proceeds to S187. Standby is made in S187 until a determination result indicating that the lane change can be performed is acquired in the startup command process, and the process proceeds to S188 on the basis of acquisition of the determination result indicating that the lane change can be performed.

A notification voice for steering start is reproduced by the directional speaker 13 in S188, and the process proceeds to S189. The LCA indicator 52c is brought into ON-display which indicates an active state in S189, and the process proceeds to S190. The status image 151 during the execution of a lane change (refer to FIG. 16) is displayed in S190, and the process proceeds to S191. A notification voice for notifying acceleration start is reproduced by the directional speaker 13 in S191, and the process proceeds to S192.

Standby is made until it is determined that movement to an adjacent lane has been completed in the startup command process in S192, and the process proceeds to S193 on the basis of the determination of the movement completion. A notification voice for lane change completion is reproduced by the directional speaker 13 in S193, and the process proceeds to S194. The status image 151 and the LCA indicator 52c are turned off by the HUD device 14 in S194, and a series of processes is finished.

As performed in the first embodiment described above, it is possible to estimate whether the current traveling state is a traveling state preferred by the driver by comparing a state value indicating the current traveling state with a preference value reflecting the traveling state preferred by the driver. Thus, when the startup of the driving support function is suggested on the basis of a deviation between the state value and the preference value, the driving support function is started up under a stressful condition for the driver and can appropriately support or substitute the driver. Thus, the HCU 100 can reduce the stress of the driver by actively operating the driving support function.

In addition, the HCU 100 of the first embodiment is capable of setting the preference value on the basis of the traveling state of the own vehicle A which is driven by the driver. The preference value can be a value which correctly reflects a traveling state preferred by the driver. Thus, the driving support function startup suggestion is appropriately performed under the condition where the driver feels high stress.

Further, the startup suggestion of the first embodiment is performed on the basis of monitoring information obtained by the external recognition system 90. The condition where the driver is likely to feel stress corresponds to a case in which unpreferable driving is forced by the preceding vehicle A1 or the parallelly traveling vehicle A2. Thus, the driving support function startup suggestion is appropriately performed under the condition where the driver feels high stress by employing monitoring information around the own vehicle A in the startup suggestion.

Further, the startup suggestion of the first embodiment is stopped by a reduction in the attention of the driver. As a result, the startup suggestion is performed in a state in which recognition by the driver can be reliably performed. Thus, unnecessary startup suggestions which are not accepted can be reduced. Further, a mistaken response to the startup suggestion by the driver whose attention is reduced can also be prevented.

In addition, the startup suggestion of the first embodiment is performed using the HUD device 14 and the directional speaker 13. Virtual display by the HUD device 14 can be visually recognized by the driver, but is less likely to be visually recognized by the occupants of the own vehicle A except the driver. Similarly, a voice reproduced by the directional speaker 13 can be heard by the driver, but is less likely to be heard by the occupants of the own vehicle A except the driver. Thus, the startup suggestion can be recognized only by the driver by using the HUD device 14 and the directional speaker 13. As a result, annoying situation for the other occupants of the own vehicle A caused by the startup suggestion is prevented.

Further, in the first embodiment, the start of the startup suggestion is notified to the driver by the notification sound. Thus, the attention of the driver can be easily directed to the suggestion images 50, 150 and the notification sound relating to the startup suggestion. As a result, it is possible to make the driver reliably recognize the startup suggestion to urge the driver to actively use the driving support function.

Further, in the first embodiment, the startup of ACC and LKA is suggested. A load of the driver for operating the accelerator can be reduced by the startup of ACC. Further, a load of the driver for operating the steering can be reduced by the startup of LKA. As described above, ACC and LKA are preferred as the driving support functions whose startup are suggested.

In addition, when the driver is forced to travel at an unpreferable traveling speed, the driver is likely to feel stress. Thus, in the first embodiment, the ACC startup suggestion is performed when a state value relating to the traveling speed deviates from the preference value. ACC started by such a suggestion can remarkably reduce the stress of the driver. In this manner, the ACC startup suggestion based on a reduction in the traveling speed is effective for reducing the stress of the driver.

Further, in the first embodiment, the target speed for constant-speed travel which is set to ACC is set on the basis of the traveling speed as a preference value. Thus, the own vehicle A under the control of ACC can perform constant-speed travel at a traveling speed preferred by the driver. As a result, the driver can have a positive impression with respect to the operation of ACC. Thus, the driving support function startup suggestion can be more easily accepted by the driver.

Further, it is necessary to keep a close observation on the rear lateral side of the own vehicle A which is difficult to visually recognize in a lane change to an adjacent lane. Thus, the lane change can be a stressful operation for the driver. Thus, when the startup of automatic lane change is suggested at an appropriate timing, it is possible to effectively reduce the stress of the driver.

In addition, in the first embodiment, even when the parallelly traveling vehicle A2 which travels in an adjacent lane has been detected, the startup of automatic lane change is suggested. In this manner, regardless of the presence or absence of the parallelly traveling vehicle A2, the driver can take an opportunity to release stress at a timing when the driver feels the stress by the startup suggestion which is promptly performed. As a result, the driver is urged to actively use the driving support function including automatic lane change.

Further, the HCU 100 of the first embodiment can suggest the startup of the driving support function not only when the state value actually deviates from the preference value, but also when a deviation of the state value is predicted. According to such a startup suggestion, it is possible to estimate whether the current traveling state is a traveling state preferred by the driver and perform the startup suggestion to the driver at a timing earlier than that in a mode in which the current state value and the preference value are compared. In particular, it becomes possible to prevent a reduction in the traveling speed of the own vehicle A by applying the startup suggestion based on estimation to automatic lane change and automatic overtaking functions. Thus, a remarkable effect can be exhibited in reducing the stress of the driver.

Further, the HCU 100 of the first embodiment can suggest the startup of the driving support function also when the occurrence of a deviation assumed scene in which the state value is likely to deviate from the preference value is estimated. In this manner, when the deviation assumed scene for which a startup suggestion is performed is previously set, the driving support function can start operating at a timing certainly earlier than when the driver starts feeling stress.

In addition, road information which is acquired by wireless communication is used for the estimation of the occurrence of a deviation assumed scene. Thus, the scene estimation unit 39 is capable of estimating the occurrence of a deviation assumed scene at an early stage by utilizing road information of a wide area which is difficult to recognize by the external recognition system 90. As described above, the HCU 100 can perform the driving support function startup suggestion with sufficient time. As a result, the operation of preventing the occurrence of a deviation assumed scene by the driving support function can be more smoothly performed.

In the first embodiment, the main processor 21 and the drawing processor 22 correspond to a "processor", and the function control unit 38 corresponds to a "device control unit". In addition, the ACC functional unit 81 corresponds to a "cruise control device", the LKA functional unit 82 corresponds to a "lane keeping device", and the LCA functional unit 83 corresponds to a "lane change device". Further, the vehicle control ECU 70 corresponds to a "driving support device", the surroundings monitoring ECU 91 corresponds to a "surroundings monitoring device", and the wireless communication device 97 corresponds to a "wireless communication device". In addition, the HCU 100 corresponds to a "startup suggestion device". Further, S103 corresponds to a "state value acquisition step", S101 corresponds to a "preference value acquisition step", and S105 and S108 correspond to a "startup suggestion step".

Second Embodiment

Figure 32:
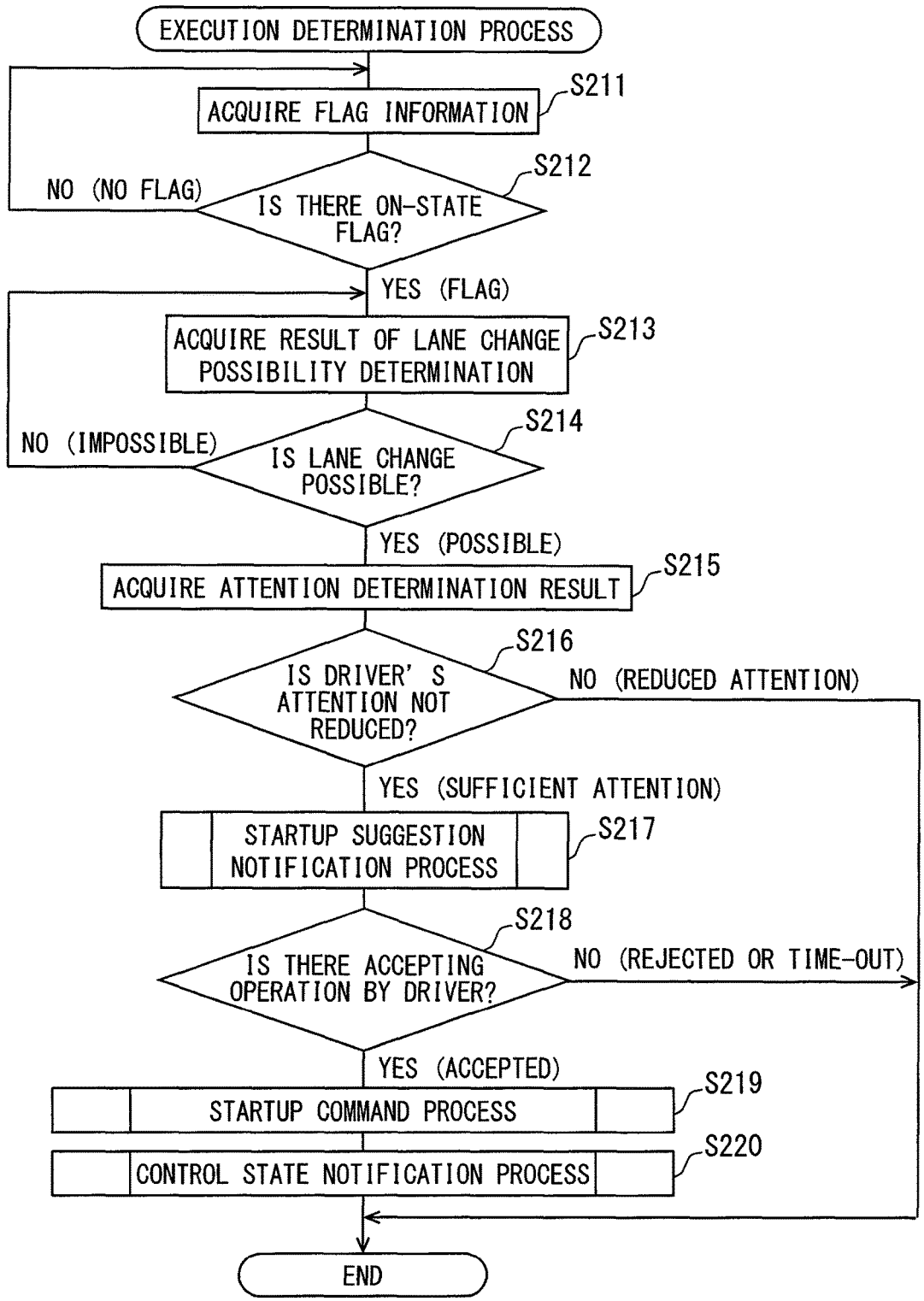
FIG. 32 is a flowchart illustrating an execution determination process according to a second embodiment.

An execution determination process by a second embodiment of the present disclosure illustrated in FIG. 32 is a modification of the execution determination process of the first embodiment (refer to FIG. 26). In the execution determination process of the second embodiment, S213 and S214 are executed in addition to the execution determination process of the first embodiment. A result of the determination of the possibility of a lane change is acquired from the surroundings monitoring ECU 91 (refer to FIG. 2) in S213, the process proceeds to S214. In S214, the process is repeatedly performed until the determination result acquired in S213 indicates that the lane change can be performed to make standby. Then, the process proceeds to S215 on the basis of acquisition of the determination result indicating that the lane change can be performed.

According to the above execution determination process, when the parallelly traveling vehicle A2 (refer to FIG. 12) has been detected on the rear lateral side of the own vehicle A (refer to FIG. 12) by the surroundings monitoring ECU 91 (refer to FIG. 2), the suggestion of the startup of automatic lane change is put on hold. Then, when the detection of the parallelly traveling vehicle A2 is stopped, a suggestion of automatic lane change is started. Note that S211 and S212 of the second embodiment are substantially the same as S111 and S112 (refer to FIG. 26) of the first embodiment, and S215 to S220 of the second embodiment are substantially the same as S113 to S118 (refer to FIG. 26) of the first embodiment.

Also in the second embodiment described above, an effect similar to the effect of the first embodiment is achieved. In addition, according to the second embodiment, the automatic lane change startup suggestion is put on hold when the parallelly traveling vehicle A2 is detected. Thus, when the automatic lane change startup suggestion is accepted by the driver, the own vehicle A can promptly start the lane change. As a result, it is possible to prevent the driver from having a negative impression with respect to the startup suggestion which is caused by the fact that the accepted lane change is not started. Thus, it is possible to urge the driver to actively use the automatic lane change function.

Third Embodiment

A suggestion determination process according to a third embodiment of the present disclosure illustrated in FIG. 33 is a modification of the suggestion determination process according to the first embodiment (refer to FIG. 25). In the suggestion determination process of the third embodiment, processes of S304 to S309 differ from the first embodiment. Note that S301 to S303 and S310 to S312 are substantially the same as S101 to S103 and S107 to S109 of the first embodiment (refer to FIG. 25).

In S304, it is determined whether an ACC startup condition is satisfied on the basis of values and pieces of information acquired in S301 to S303. When it is determined that the startup condition is satisfied in S304, the process proceeds to S305. An ACC startup suggestion flag is turned on in S305, and the process proceeds to S307. On the other hand, when it is determined that the startup condition is not satisfied in S304, the process proceeds to S306. The ACC startup suggestion flag is turned off in S306, and a series of processes is finished.

In S307, it is determined whether an LKA startup condition is satisfied on the basis of the values and the pieces of information acquired in S301 to S303. When it is determined that the startup condition is satisfied in S307, the process proceeds to S308. An LKA startup suggestion flag is turned on in S308, and the process proceeds to S310. On the other hand, when it is determined that the startup condition is not satisfied in S307, the process proceeds to S309. The LKA startup suggestion flag is turned off in S309, and a series of processes is finished.

In the above suggestion determination process, the LKA startup condition can be set to contents different from the ACC startup condition. Thus, the LKA startup suggestion and the ACC startup suggestion can be performed at different timings. As a result, it is possible to further suggest the startup of LKA in a state in which ACC is active.

Also in the third embodiment described above, an effect similar to the effect of the first embodiment is achieved. In addition, the load of the driver can be reduced step by step by the diving support functions which are sequentially started up by sequentially suggesting the startup of ACC and the startup of LKA as performed in the third embodiment. Thus, the driver can reliably have a real feeling of a driving load reducing effect by the driving support functions. As a result, the driving support function startup suggestion can be easily accepted by the driver. Note that S305, S308, and S311 in the third embodiment correspond to a "startup suggestion step".

Other Embodiments

The plurality of embodiments according to the present disclosure have been described above. However, the present disclosure is not limited to the above embodiments, and can be applied to various embodiments and combinations without departing from the gist of the disclosure.

In the above embodiments, the current state value and the preference value relating to the traveling speed are directly compared as the conditions for the suggestions of the startup of ACC, LKA, and automatic lane change.

However, as performed in the above first embodiment, the startup of each driving support function can be suggested on the basis of the comparison between the state value indicating the future traveling state of the own vehicle A and the preference value.

Figure 4:
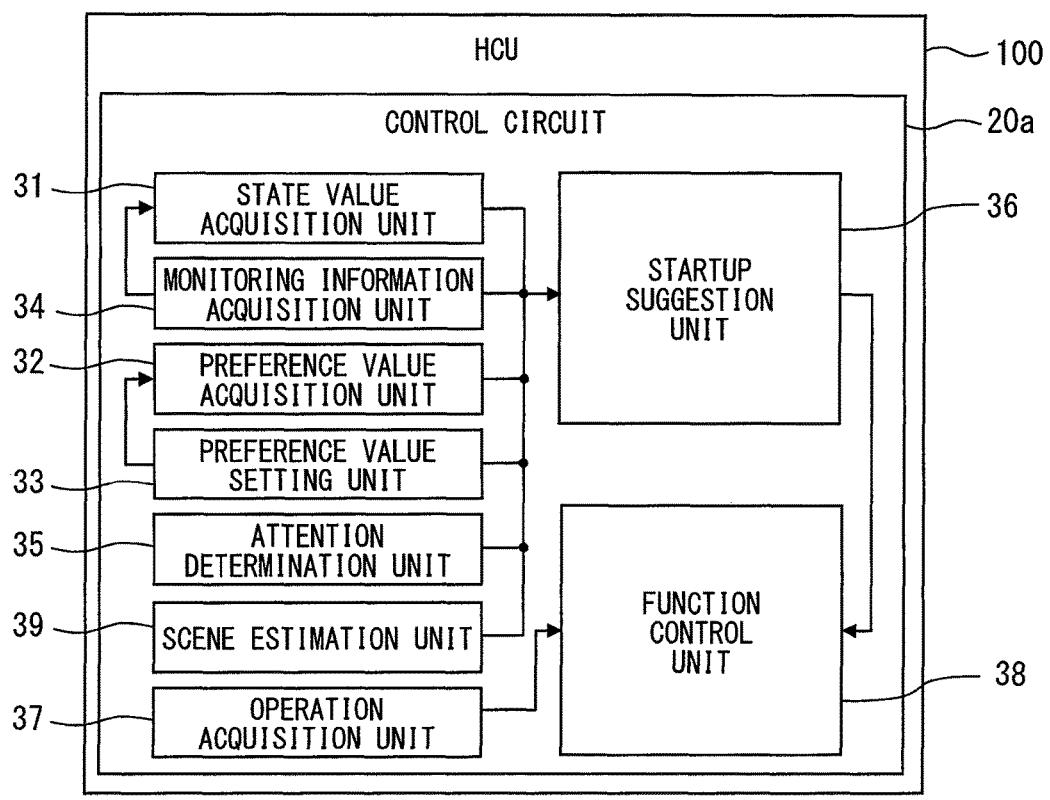
FIG. 4 is a diagram illustrating functional blocks constructed in a control circuit of an HCU.

Specifically, the state value acquisition unit 31 (refer to FIG. 4) can acquire a state value indicating a traveling state of another vehicle (e.g., the preceding vehicle A1) around the own vehicle A which is detected by the surroundings monitoring ECU 91 through the monitoring information acquisition unit 34 (refer to FIG. 4). The startup suggestion unit 36 (refer to FIG. 4) predicts a reduction in the traveling speed of the own vehicle A in the future (after t seconds, refer to FIG. 17) on the basis of the current traveling speed of the own vehicle A and the relative speed which is calculated from the traveling speed of the preceding vehicle A1. In this manner, when a deviation of the future traveling speed of the own vehicle A from the preference value is predicted, the startup suggestion unit 36 suggests the startup of each driving support function to the driver.

In the above first embodiment, the startup suggestion based on estimation of the occurrence of a deviation assumed scene is started before a branch point or a starting point of a lane restriction by a predetermined distance. A timing of performing such a startup suggestion can be appropriately changed. For example, when road information indicating that there is a traffic jam in a branch point or a starting point of a lane restriction has been acquired, the startup suggestion unit can perform the automatic lane change startup suggestion at a timing earlier than that in the case with no traffic jam. Such an embodiment eliminates the necessity for the driver to perform a stressful operation such as breaking into a jammed row of vehicles.

In the above embodiments, each function for startup suggestion which is provided by each of the processors 21, 22 of the HCU 100 for the driving support function startup suggestion can be provided by hardware and software different from the above, or the combination of the hardware and the software. Further, each function for startup suggestion may be provided by using one or more discriminators generated by machine learning.

For example, in a configuration in which no HCU is provided in an in-vehicle network, display devices such as an HUD device, a combination meter, and a CID can execute, as the "startup suggestion device", each process for startup suggestion by a processor of a control circuit. Further, an electronic device which is carried into the own vehicle A by the driver can execute, as the "startup suggestion device", each process for startup suggestion by a processor.

Further, part of each process relating to startup suggestion can also be executed by a processor of a vehicle control ECU.

Further, the driving support function provided by the processor 71 of the vehicle control ECU 70 can also be provided by hardware and software different from the above, or the combination of the hardware and the software. For example, part of each process relating to the driving support function can also be executed by a processor of an HCU.

Further, monitoring information obtained by monitoring the surroundings of the own vehicle A may not be generated by the surroundings monitoring ECU. The monitoring information can be generated, for example, by an HCU or a vehicle control ECU which acquires detection information of the preceding vehicle and the parallelly traveling vehicle from the surroundings monitoring ECU. In addition, the lane change possibility determination based on detection information of the parallelly traveling vehicle may not be performed by the surroundings monitoring ECU. The HCU or the vehicle control ECU can perform the lane change possibility determination on the basis of detection information acquired from the surroundings monitoring ECU.

In the above embodiments, LKA is switched from an active state to a standby state during execution of automatic lane change. Also in this case, the LKA indicator maintains its display mode and is displayed in a mode indicating an active state. As a result, it is possible to reduce annoying display. However, in order to perform correct information presentation to the driver, the LKA indicator may be switched to a display mode indicating a standby state during the execution of automatic lane change.

In the above embodiments, the HUD device 14 is used as a display device for displaying the suggestion image 50. However, a startup suggestion by an image may be performed by a suggestion image which is displayed on a display screen of the combination meter or the CID. Further, a startup suggestion by a voice may be performed by a notification voice which is output not from the directional speaker, but from a normal audio speaker. Further, a startup suggestion may be performed by only either a voice or an image.

In the above embodiments, targets of the startup suggestion are ACC, LKA, and automatic lane change as the driving support functions. However, the driving support function whose startup is suggested is not limited to these functions. For example, various driving support functions which are executable by the vehicle control ECU such as automatic overtaking for overtaking the preceding vehicle by a plurality of lane changes can be the targets for startup suggestion. Further, the plurality of driving support functions may be simultaneously performed as with ACC and LKA of the first embodiment or may be sequentially performed at different timings as with the third embodiment.

In an embodiment in which startup suggestions for a plurality of driving support functions can be performed as with the above embodiments, conditions for starting the respective startup suggestions may differ from each other. For example, monitoring information such as the presence or absence of the preceding vehicle may not be included in the startup suggestion starting conditions. Various pieces of information relating to the own vehicle, another vehicle, and the occupants of the own vehicle can be utilized in the startup suggestion starting conditions.

In the above embodiments, an accepting operation and a rejecting operation for the startup suggestion are input to the switch unit provided in the steering. However, for example, an operation to a switch which is provided in a center console can be used as the accepting operation and the rejecting operation. Further, when voice input is employed, speech of the driver can be used as the accepting operation and the rejecting operation.

It is noted that a flowchart or the processing of the flowchart in the present application includes sections (also referred to as steps), each of which is represented, for instance, as S101. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A startup suggestion device that is mounted on a vehicle together with a driving support device for assisting a driving operation of a driver or taking a wheel, and suggests a startup of the driving support device to the driver, the startup suggestion device comprising:
a state value acquisition unit that acquires a state value indicative of a traveling state of the vehicle;
a preference value acquisition unit that acquires a preference value indicating a traveling state of the vehicle that is preferred by the driver; and
a startup suggestion unit that suggests the startup of operation of the driving support device to assist the driving operation of the driver or taking a wheel and to reduce a driving load of the driver according to a comparison between the state value and the preference value.

2. The startup suggestion device according to claim 1, wherein:
the startup suggestion unit suggests the startup of the driving support device to the driver when a current state value acquired by the state value acquisition unit deviates from the preference value.

3. The startup suggestion device according to claim 1 that is mounted on the vehicle together with a surrounding monitoring device for monitoring a surrounding of the vehicle, further comprising:

a monitoring information acquisition unit that acquires monitoring information around the vehicle acquired by the surrounding monitoring device, wherein:
the startup suggestion unit suggests the startup of the driving support device according to the monitoring information acquired by the monitoring information acquisition unit.

4. The startup suggestion device according to claim 3, wherein:
the state value acquisition unit further acquires an another-vehicle state value indicative of a traveling state of another vehicle according to the monitoring information relating to the another vehicle detected by the surrounding monitoring device; and
the startup suggestion unit suggests the startup of the driving support device to the driver when the startup suggestion unit predicts based on a current state value and the another-vehicle state value that a future state value of the vehicle deviates from the preference value of the vehicle.

5. The startup suggestion device according to claim 1, further comprising:
a scene estimation unit that estimates an occurrence of a deviation assumed scene previously assumed that the state value of the vehicle deviates from the preference value, wherein:
the startup suggestion unit suggests the startup of the driving support device to the driver to avoid an occurrence of an estimated deviation assumed scene when the scene estimation unit estimates the occurrence of the deviation assumed scene.

6. The startup suggestion device according to claim 5 that is mounted on the vehicle together with a wireless communication device for acquiring, by wireless communication, road information relating to a road where the vehicle travels, wherein:
the scene estimation unit estimates the occurrence of the deviation assumed scene according to the road information acquired by the wireless communication unit.

7. The startup suggestion device according to claim 1, wherein:
the startup suggestion unit suggests a startup of a lane change device, which drives the vehicle from a current traveling lane to an adjacent lane, as the driving support device to the driver.

8. The startup suggestion device according to claim 3, wherein:
the startup suggestion unit suggests a startup of a lane change device, which drives the vehicle from a current traveling lane to an adjacent lane, as the driving support device to the driver; and
the startup suggestion unit suggests the startup of the lane change device to the driver when the surrounding monitoring device detects a parallel traveling vehicle traveling in the adjacent lane.

9. The startup suggestion device according to claim 3, wherein:
the startup suggestion unit suggests a startup of a lane change device, which drives the vehicle from a current traveling lane to an adjacent lane, as the driving support device to the driver; and
the startup suggestion unit suspends to suggest the startup of the lane change device when the surrounding monitoring device detects a parallel traveling vehicle traveling in the adjacent lane.

10. The startup suggestion device according to claim 1, wherein:

the startup suggestion unit suggests a startup of at least one of a cruise control device, which controls a traveling speed of the vehicle or a distance from another vehicle in front of the vehicle, or a lane keeping device, which keeps the vehicle within a current traveling lane, as the driving support device to the driver.

11. The startup suggestion device according to claim 10, wherein:
the state value acquisition unit acquires a current traveling speed of the vehicle as the state value:
the preference value acquisition unit acquires a traveling speed preferred by the driver as the preference value; and
the startup suggestion unit suggests the startup of the cruise control device to the driver according to a deviation between the preference value of the travelling speed and the state value of the current traveling speed.

12. The startup suggestion device according to claim 10, further comprising:
a device control unit that sets a target speed for causing the vehicle to travel at a constant speed by the cruise control device according to the traveling speed of the preference value.

13. The startup suggestion device according to claim 10, wherein:
the startup suggestion unit further suggests the startup of the lane keeping device under a condition that the cruise control device is in operation.

14. The startup suggestion device according to claim 1, further comprising:
a preference value setting unit that sets the preference value of the driver according to the traveling state of the vehicle driven by the driver.

15. The startup suggestion device according to claim 1, further comprising:
an attention determination unit that determines a reduction in attention of the driver, wherein:
the startup suggestion unit stops suggesting the startup of the driving support device when the attention determination unit determines that the attention is reduced.

16. The startup suggestion device according to claim 1 that is mounted on the vehicle together with a head-up display device for projecting an image on a projection area arranged in the vehicle and displaying a virtual image of the image to be visually recognizable by the driver, wherein:
the startup suggestion unit suggests the startup of the driving support device with a suggestion image projected on the projection area from the head-up display device.

17. The startup suggestion device according to claim 1 that is mounted on the vehicle together with a directional speaker for outputting a directional sound wave toward the driver, wherein:
the startup suggestion unit suggests the startup of the driving support device with a suggestion voice output from the directional speaker toward the driver.

18. The startup suggestion device according to claim 17, wherein:
the startup suggestion unit notifies the driver of a start of a startup suggestion using a notification sound reproduced by the directional speaker and then notifies the driver of contents of the startup suggestion.

19. A startup suggestion method for suggesting a startup of a driving support device to a driver in a vehicle that includes the driving support device for assisting a driving operation of a driver or taking a wheel, the startup suggestion method comprising:
acquiring a state value indicative of a traveling state of the vehicle;
acquiring a preference value indicating a traveling state of the vehicle that is preferred by the driver; and
suggesting the startup of operation of the driving support device to the driver for assisting the driving operation of the driver and to reduce a driving load of the driver according to a comparison between the state value and the preference value, wherein:
the acquiring of the state value, the acquiring of the preference value, and the suggesting of the startup of the driving support device are executed by at least one processor.

20. The startup suggestion device according to claim 1, wherein:
the startup suggestion unit suggests the startup of the driving support device before the driving support device starts to assist the driving operation.

21. The startup suggestion method according to claim 19, wherein:
the suggesting of the startup of the driving support device is executed before the driving support device starts to assist the driving operation.

* * * * *